United States Patent
Ziegenbein

(10) Patent No.: US 10,640,927 B2
(45) Date of Patent: *May 5, 2020

(54) ABSORBENT PAPER PRODUCTS HAVING UNIQUE PHYSICAL STRENGTH PROPERTIES

(71) Applicant: Mercer International Inc., Vancouver (CA)

(72) Inventor: Tobias Ziegenbein, Vancouver (CA)

(73) Assignee: Mercer International, Inc., Vancouver (CA)

( * ) Notice: Subject to any disclaimer, the term of this patent is extended or adjusted under 35 U.S.C. 154(b) by 197 days.

This patent is subject to a terminal disclaimer.

(21) Appl. No.: 15/708,241

(22) Filed: Sep. 19, 2017

(65) Prior Publication Data

US 2018/0187377 A1    Jul. 5, 2018

Related U.S. Application Data

(60) Provisional application No. 62/396,812, filed on Sep. 19, 2016.

(51) Int. Cl.
*D21H 27/00* (2006.01)
*D21H 21/20* (2006.01)
(Continued)

(52) U.S. Cl.
CPC ........... *D21H 27/30* (2013.01); *B32B 29/005* (2013.01); *D21F 11/14* (2013.01); *D21H 11/02* (2013.01);
(Continued)

(58) Field of Classification Search
None
See application file for complete search history.

(56) References Cited

U.S. PATENT DOCUMENTS 3,058,873 A    10/1962 Keim
3,301,746 A    1/1967 Sanford et al.
(Continued)

FOREIGN PATENT DOCUMENTS

WO    2004057109    2/2004
WO    2011154855    5/2011
(Continued)

OTHER PUBLICATIONS

Smook, Gary A., Handbook for Pulp and Paper Technologists, 2nd ed, Angus Wilde Publications, 1992, pp. 264-265. (Year: 1992).*
(Continued)

*Primary Examiner* — Dennis R Cordray
(74) *Attorney, Agent, or Firm* — Stephen T. Murphy; Peter D. Meyer

(57) ABSTRACT

An absorbent towel paper web is disclosed. The absorbent towel paper web has from 20% to 90% of a soft wood pulp fiber mixture having from 18.5% to 88.5% of soft wood pulp fiber, wherein the soft wood pulp fiber is optionally refined; from 0.25% to 5.0% of cationic strengthening polymer, from 10% to 60% of a hard wood pulp fiber mixture; and not more than 10% moisture. The absorbent towel paper web has a Mean Square Dry Tensile Strength index ranging from 6 N·m/g to 12 N·m/g and a Wet Tensile Strength to Dry Tensile Strength Ratio value ranging from 0.295 to 0.35.

24 Claims, 4 Drawing Sheets

(51) Int. Cl.
*D21H 17/44* (2006.01)
*D21H 27/30* (2006.01)
*D21H 11/08* (2006.01)
*D21H 11/18* (2006.01)
*D21H 15/02* (2006.01)
*D21F 11/14* (2006.01)
*D21H 11/02* (2006.01)
*B32B 29/00* (2006.01)

(52) U.S. Cl.
CPC .............. *D21H 11/08* (2013.01); *D21H 11/18* (2013.01); *D21H 15/02* (2013.01); *D21H 17/44* (2013.01); *D21H 21/20* (2013.01); *D21H 27/002* (2013.01); *D21H 27/005* (2013.01); *B32B 2250/02* (2013.01); *B32B 2307/54* (2013.01); *B32B 2317/12* (2013.01); *B32B 2554/00* (2013.01)

(56) References Cited

U.S. PATENT DOCUMENTS

| | | | |
|---|---|---|---|
| 3,880,368 A | 4/1975 | Matthew | |
| 3,974,025 A | 8/1976 | Ayers | |
| 3,994,771 A | 11/1976 | Morgan, Jr. et al. | |
| 4,191,609 A | 3/1980 | Trokhan | |
| 4,300,981 A | 11/1981 | Carstens | |
| 4,374,702 A | 2/1983 | Turbak et al. | |
| 4,445,974 A | 5/1984 | Stenberg | |
| 4,447,294 A | 5/1984 | Osborn, III | |
| 4,529,480 A | 7/1985 | Trokhan | |
| 4,637,859 A | 1/1987 | Trokhan | |
| 4,735,849 A | 4/1988 | Murakami et al. | |
| 5,048,589 A | 9/1991 | Cook et al. | |
| 5,087,324 A | 2/1992 | Awofeso et al. | |
| 5,129,988 A | 7/1992 | Farrington, Jr. | |
| 5,399,412 A | 3/1995 | Sudall et al. | |
| 5,494,554 A | 2/1996 | Edwards et al. | |
| 5,582,685 A | 12/1996 | Vinson | |
| 5,607,551 A | 3/1997 | Farrington, Jr. et al. | |
| 5,656,132 A | 8/1997 | Farrington, Jr. et al. | |
| 5,759,926 A | 6/1998 | Pike et al. | |
| 5,840,403 A | 11/1998 | Trokhan et al. | |
| 5,895,710 A | 4/1999 | Sasse et al. | |
| 6,017,417 A | 1/2000 | Wendt et al. | |
| 6,017,418 A | 1/2000 | Oriaran et al. | |
| 6,054,218 A | 4/2000 | Nucci et al. | |
| 6,303,000 B1 | 10/2001 | Floyd et al. | |
| 6,379,494 B1 | 4/2002 | Jewell et al. | |
| 6,398,906 B1 | 6/2002 | Kobayashi et al. | |
| 6,398,916 B1 | 6/2002 | Klerelid | |
| 6,423,183 B1* | 7/2002 | Goulet ................... | D21C 9/002 162/123 |
| 6,432,267 B1 | 8/2002 | Watson | |
| 6,602,994 B1 | 8/2003 | Cash et al. | |
| 7,314,665 B2 | 1/2008 | Stelljes, Jr. et al. | |
| 7,718,036 B2 | 5/2010 | Sumnicht et al. | |
| 7,744,726 B2 | 6/2010 | Scherb et al. | |
| 7,811,418 B2 | 10/2010 | Klerelid et al. | |
| 7,931,781 B2 | 4/2011 | Scherb et al. | |
| 7,988,829 B2 | 8/2011 | Klerelid et al. | |
| 8,066,849 B2 | 11/2011 | Kokko et al. | |
| 8,236,140 B2 | 8/2012 | Scherb et al. | |
| 8,268,130 B2 | 9/2012 | Sinkko et al. | |
| 8,298,374 B2 | 10/2012 | Shannon et al. | |
| 8,377,563 B2 | 2/2013 | Miyawaki et al. | |
| 8,388,803 B2 | 3/2013 | Super et al. | |
| 8,444,808 B2 | 5/2013 | Koslow et al. | |
| 8,608,906 B2 | 12/2013 | Laleg et al. | |
| 8,608,909 B2 | 12/2013 | Scherb et al. | |
| 8,658,287 B2 | 2/2014 | Berglund et al. | |
| 8,778,505 B2 | 7/2014 | Shannon | |
| 8,821,690 B2 | 9/2014 | Oksanen et al. | |
| 8,834,677 B2 | 9/2014 | Tirimacco et al. | |
| 8,871,922 B2 | 10/2014 | Hu et al. | |
| 8,906,198 B2 | 12/2014 | Sabourin et al. | |
| 8,992,728 B2 | 3/2015 | Isogai et al. | |
| 9,017,517 B2 | 4/2015 | Super et al. | |
| 9,187,865 B2 | 11/2015 | Nelson et al. | |
| 9,206,551 B2 | 12/2015 | Esser | |
| 9,340,914 B2 | 5/2016 | Manifold et al. | |
| 9,375,116 B2 | 6/2016 | Graff | |
| 9,422,641 B2 | 8/2016 | Jakson et al. | |
| 9,441,326 B2 | 9/2016 | Kawka | |
| 9,493,911 B2 | 11/2016 | Miller et al. | |
| 9,506,198 B2 | 11/2016 | Laine et al. | |
| 9,663,901 B2 | 5/2017 | Heiskanen et al. | |
| 9,702,085 B2 | 7/2017 | Kosonen et al. | |
| 9,739,015 B2 | 8/2017 | Miller et al. | |
| 9,777,129 B2 | 10/2017 | Sumnicht et al. | |
| 9,879,361 B2 | 1/2018 | Pande et al. | |
| 2002/0074100 A1 | 6/2002 | Yeh | |
| 2002/0168912 A1 | 11/2002 | Bond et al. | |
| 2003/0203695 A1 | 10/2003 | Polanco et al. | |
| 2004/0101704 A1* | 5/2004 | Hermans ................ | D21F 11/14 428/535 |
| 2004/0118540 A1 | 6/2004 | Gamier et al. | |
| 2005/0153100 A1 | 7/2005 | Zoller et al. | |
| 2007/0207293 A1 | 9/2007 | Santiago | |
| 2008/0057307 A1 | 3/2008 | Koslow et al. | |
| 2009/0020248 A1 | 1/2009 | Sumnicht et al. | |
| 2009/0054858 A1 | 2/2009 | Cheng et al. | |
| 2010/0065236 A1 | 3/2010 | Henriksson et al. | |
| 2010/0147473 A1 | 6/2010 | Ward et al. | |
| 2010/0186922 A1 | 7/2010 | Quigley | |
| 2011/0265965 A1 | 11/2011 | Sumnicht et al. | |
| 2011/0277947 A1* | 11/2011 | Hua ...................... | D21H 15/00 162/28 |
| 2012/0012031 A1 | 1/2012 | Husband et al. | |
| 2012/0094953 A1 | 4/2012 | Gane et al. | |
| 2012/0132383 A1 | 5/2012 | Laine et al. | |
| 2012/0136146 A1 | 5/2012 | Heiskanen et al. | |
| 2012/0244320 A1* | 9/2012 | Sauter ...................... | B31F 1/07 428/156 |
| 2012/0277351 A1 | 11/2012 | Yano et al. | |
| 2012/0285640 A1 | 11/2012 | Westland et al. | |
| 2013/0017394 A1 | 1/2013 | Hua et al. | |
| 2013/0319625 A1 | 12/2013 | Mohammadi et al. | |
| 2014/0124152 A1 | 5/2014 | Polat et al. | |
| 2015/0041091 A1 | 2/2015 | Castro et al. | |
| 2015/0125658 A1 | 5/2015 | Bilodeau et al. | |
| 2015/0275433 A1 | 10/2015 | Dorris et al. | |
| 2015/0368368 A1 | 12/2015 | Retsina et al. | |
| 2016/0090692 A1 | 3/2016 | Eagles et al. | |
| 2016/0138224 A1 | 5/2016 | Shannon et al. | |
| 2016/0160448 A1 | 6/2016 | Miller, IV et al. | |
| 2016/0215179 A1 | 7/2016 | Sumnicht et al. | |
| 2016/0289453 A1 | 10/2016 | Cai et al. | |
| 2016/0319482 A1 | 11/2016 | Ben et al. | |
| 2016/0362843 A1 | 12/2016 | Hermans et al. | |
| 2017/0175332 A1 | 6/2017 | Monhammadl et al. | |

FOREIGN PATENT DOCUMENTS

| | | |
|---|---|---|
| WO | 2011064441 | 6/2011 |
| WO | 2012097446 | 7/2012 |
| WO | 2013160553 | 10/2013 |
| WO | 2014029917 | 2/2014 |
| WO | 2015044520 | 4/2015 |
| WO | 2016176759 | 11/2016 |
| WO | 2017008171 | 1/2017 |

OTHER PUBLICATIONS

Valmet, "Advantage™ NTT® Technology", 8 pages, no date, [online], retrieved from the Internet, [retrieved Sep. 19, 2019],<URL: https://valmetsites.secure.force.com/solutionfinderweb/sfc/servlet. shepherd/version/download/06858000000qZuzAAE>. (Year: 2019).*

Voith, "ATMOS technology",6 pages, 2012, [online], retrieved from the Internet, [retrieved Sep. 19, 2019], <URL: http://www.voith. com/corp-en/1375_e_2012-02-27_atmos-technology_low.pdf>. (Year: 2012).*

(56) References Cited

OTHER PUBLICATIONS

Ulrich Hirn & Robert Schennach, Comprehensive analysis of individidual Pulp fiber bonds quantifies the mechanisms of fiber bonding in paper, Nature Magazine/Scientific Reports, May 22, 2015.
Jack Miller, Nanocellulosestate of the Industry, Dec. 2015.
Rauni Seppanen, Use of nanocellulose for high performance papermaking products, Sep. 30, 2014.
Robert J. Moon, Ashlie Martini, John Nairn, John Simonsen, Jeffrey Youngblood, Cellulose nanomaterials review: structure, properties and nanocomposites, Chem. Soc. Rev., 2011,40, 3941-3994.
E.C. Homonoff, R.E. Evans, C.D. Weaver, Nanofibrillated Cellulose Fibers: Where Size Matters in Opening New Markets to Nanofiber Usage, Presentation to 2008 TAPPI Nanotechnology Conference, Jun. 25-27, 2008.
Mark Williamson, Canadian mills test drive cellulose filaments, Paper Advance, Jun. 8, 2015.
Suzanne Pinkney, David Skuse, Neil Rowson, Stuart Blackburn, Microfibrillated cellulose—a new structural material.
Tero Taipale, Interactions of Microfibrillated Cellulose and Cellulosic Fines with Cationic Polyelectrolytes, Doctoral Dissertation, TKK Reports in Forest Products Technology, Series A12, Oct. 22, 2010.
Mikael Ankerfors, Microfibrillated cellulose: Energy-efficient preparation techniques and applications in paper, Doctoral Thesis, KTH Royal Institute of Technology, Stockholm, Sweden, 2015.
Hernan Charreau, Maria L. Foresti, and Analia Vazquez, Nanocellulose Patents Trends: A Comprehensive Review on Patents on Cellulose Nanocrystals, Microfibrillated and Bacterial Cellulose, Recent Patents on Nanotechnology, 2012, 7, 56-80.
Gary Chinga-Carrasco, Cellulose fibres, nanofibrils and microfibrils: The morphological sequence of MFC Components from a plant physiology and fibre technology point of view, Nanoscale Research Letters 20116:417, Jun. 13, 2011.
Solenis International LP, Hercobond (TM) 1194 dry strength resin, Product Data solenis.com, DSR-PDS-NA-Hercobond 1194-R2.
Valmet, Valmet's Advantage (TM) NTT (R) Concept, Valmet Technical Paper Series, Dec. 3, 2009.
Balazs Tolnai, FiloCell (TM)—Commercialization of Cellulose Filament, Pacwest Conference, Jun. 11, 2015.
Xujun Hua, Makhlouf Laleg and Thomas Owston, Cellulose Filaments: Discovery by FPInnovations of a Novel Strengthening Agent, Pacwest Conference, Jun. 11, 2015.
Israel Gonzalez, Sami Boufi, Maria Angels Pelach, Manelalcala Fabiola Vilaseca, and Pere Mutje, Nanofibrillated Cellulose as Paper Additive in Eucalyptus Pulp, BioResources.com, 5167-5180, 2012.

\* cited by examiner

ABSORBENT PAPER PRODUCTS HAVING UNIQUE PHYSICAL STRENGTH PROPERTIES This application claims the benefit of the filing date of U.S. Provisional patent application Ser. No. 62/396,812 filed Sep. 19, 2016.

FIELD OF THE INVENTION

The present invention relates to paper products. More specifically, the present invention relates to absorbent paper products having unique physical strength properties. Even more specifically, the present invention relates to absorbent paper products having high dry tensile strength and a high ratio of Cross-directional Wet Tensile Strength to Cross-directional Dry Tensile Strength.

BACKGROUND OF THE INVENTION

Tissue products such as facial tissues, paper towels, bath tissues, napkins and other similar products, are designed to include several important properties. For example products should have good bulk, good absorbency, a soft feel, and should have good strength and durability. Unfortunately, when steps are taken to increase one property of the product, the other characteristics of the product are often adversely affected.

Formulators have for years attempted, to balance the level of softwood fibers in their paper structures so ensure adequate strength of their structures while at the same time trying to minimize the negative impacts from higher levels of softwood fibers.

One example of the problem is demonstrated by the efforts that formulators of paper toweling products have been putting forth, working to develop new products that have higher in-use wet strength while maintaining or reducing dry strength. However, as formulators use typical paper-making machine process variables to increase product in-use wet strength, other consumer desired attributes, such as absorbency and/or softness typically decreases. The problem formulators struggle with for improving paper toweling is, how to increase towel in use wet strength while maintaining or improving softness and/or absorbency and/or decrease softwood inclusion while maintaining or reducing total product dry strength and increasing sheet flexibility. All of the normal paper-making machine process variables available to a papermaker for increasing strength normally can negatively affect the sheet feel and can negatively impact product absorbency.

Accordingly there continues to be a need for new fibrous paper structures that further optimize the physical product performance of towel products that increase wet strength without sacrificing softness, absorbency and paper making reliability. Specifically, there is a need for new fibrous paper structures that increase wet strength while maintaining or increasing dry strength. Such structures are especially valuable for multi-density paper making structures with non-limiting examples of such structures being manufactured on Through-Air Dried, fabric Crepe, NTT, ATMOS and UCTAD machine processes.

SUMMARY OF THE INVENTION

The development of the present invention is an absorbent towel paper web having a machine direction and a cross-machine direction orthogonal to the direction of the paper-making machine on which the towel paper web was made, the web comprising (a) from about 20% to about 90% by weight of the dry fiber basis of the towel paper web of a refined soft wood pulp fiber mixture comprising i.) from about 18.5% to about 88.5% by weight of the dry fiber basis of the towel paper web of soft wood pulp fiber, wherein the soft wood pulp fiber is optionally refined before being added to the mixture; ii.) from about 0.25% to about 5.0% by weight of the dry fiber basis of the towel paper web of cationic strengthening polymer, (b) from about 10% to about 55% by weight of the dry fiber basis of the tissue paper web of a hard wood pulp fiber mixture and (c) not more than about 10% by weight moisture and, wherein the paper towel web has a Mean Square Dry Tensile index ranging from about 6 N·m/g to about 12 N·m/g; and wherein the paper web has a Cross-directional Wet Tensile Strength to Cross-directional Dry Tensile Strength Ratio value ranging from about 0.20 to about 0.50.

DETAILED DESCRIPTION OF THE INVENTION

Figure 1:
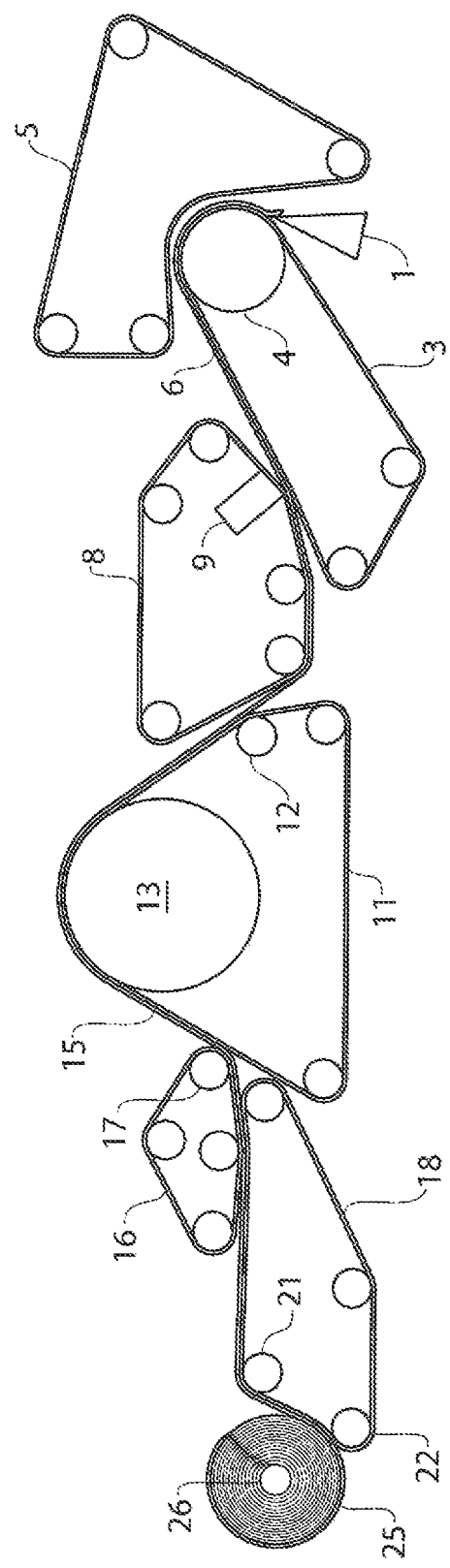
FIG. 1. is a schematic diagram of one embodiment of a process for making a multi-density absorbent paper towel via a Through-Air Dried paper-making machine for use in the present disclosure.

The present disclosure relates to absorbent towel paper webs having a, high wet tensile strength to dry strength ratio while maintaining dry tensile despite having lower refining energy input to the softwood stream and while maintaining cationic resin addition constant.

The paper towel webs comprise from about 20% to about 90% by weight of the dry fiber basis of the towel paper web of a refined soft wood pulp fiber mixture. The refined soft wood pulp fiber mixture comprises from about 18.5% to about 88.5% by weight of the dry fiber basis of the towel paper web of soft wood pulp fiber. The soft wood pulp fiber is optionally refined before being added to the mixture. The soft wood pulp fiber mixture also comprises from about 0.25% to about 5.0% by weight of the dry fiber basis of the towel paper web of a cationic strengthening polymer. The paper towel webs also comprise from about 10% to about 55% by weight of the dry fiber basis of the towel paper web of a hard wood pulp fiber mixture. The paper towel webs comprise not more than about 10% by weight moisture.

The paper towel webs maintain dry strength as measured by having a Mean Square Dry Tensile index ranging from about 6 N·m/g to about 12·N·m/g or as measured by Dry Tensile Strength index ranging from about 300 N/m to about 600 N/m. The paper towel webs have improved wet strength in relation to the web's dry strength as measured by having a Cross-directional Wet Tensile Strength to Cross-directional Dry Tensile Strength Ratio value ranging from about 0.20 to about 0.50, preferably from about 0.295 to about 0.35.

As used herein, "Paper Product" refers to any formed, fibrous structure products, traditionally, but not necessarily, comprising cellulose fibers. In one embodiment the paper products of the present invention include absorbent towel products ("Paper Towel Product"). In an alternative embodiment, the paper products of the present invention may include soft sanitary tissue products.

"Absorbent towel product" as used herein is a class of paper product that is designed and manufactured to meet the consumer need for liquid absorption and wet scrubbing along with soft hand feel. Absorbent towel products are made on the same paper making technology as sanitary tissue and facial tissue, but raw materials, paper making process setup, basis weight and other raw materials are optimized to deliver the desired consumer attributes.

The paper product of the present disclosure refers to paper products comprising paper tissue products or paper towel products. The disclosed paper technology in general, includes but is not limited to, conventional felt pressed or conventional wet-pressed tissue papers, pattern densified tissue papers, wet creped tissue paper products, Through-Air Dried tissue paper products whether creped or uncreped. For example, a paper making process of the present disclosure can utilize adhesive creping, wet creping, double-creping, embossing, wet-pressing, air pressing, through-air drying, creped through-air drying, uncreped through-air drying, as well as other steps in forming the paper web. Some examples of such techniques are disclosed in U.S. Pat. Nos. 4,529,480, 5,048,589, 5,399,412, 5,129,988, 5,494,554, 5,607,551, 6,398,916, 7,744,726 and 8,388,803.

When forming multi-ply towel products, the separate plies can be made from the same process of from different processes as desired. For example, in one embodiment, tissue or towel webs may be creped through-air dried webs formed using processes known in the art.

To form such webs, an endless traveling forming fabric, suitably supported and driven by rolls, receives the layered or non-layered paper making stock issuing from the head-box. A vacuum box is disposed beneath the forming fabric and is adapted to remove water from the fiber furnish to assist in forming a web. From the forming wire/fabric, a formed web is transferred to a second fabric by a vacuum assist or mechanical means, and this second template may be either a wire, a felt or a woven fabric as long as the desired topography is created in the structure of the template. The use of a sheet forming template that creates a paper making structure with a plurality of fiber enriched regions of high local basis weight interconnected with a plurality of lower local basis weight regions. The fabric is supported tor movement around a continuous path by a plurality of guide rolls. A pick up roll designed to facilitate transfer of web from fabric to fabric may be included to transfer the web.

The formed web is then dried to a moisture level less than about 10% by weight moisture, preferably less than about 6%, and more preferably less than about 4% by weigh moisture. Preferably the formed web is dried blowing heated air through the formed web and then by transfer to the surface of a rotatable heated dryer drum, such as a Yankee dryer. The drying cylinder is optionally provided with a resinous protective coating layer underneath the resinous adhesive coating composition. The resinous adhesive coating composition is preferably rewettable. The process is operated such that the adhesive coating is maintained to provide sufficient wet tack strength upon the transfer of the web to the drying cycling to secure the web during drying.

The adhesive resin coating composition is also maintained such that the adhesive coating compositions pliant when dried such that the web may be removed from the drying cylinder without significant sheet damage when drying is accomplished. The web may be transferred to the Yankee directly from the through drying fabric, if the drying fabric has topography, or preferably, transferred to an impression fabric which is then used to transfer the web to the Yankee dryer. The web is then removed from the dryer drum by a creping blade. The creping of the web further reduces internal bonding within the web and increases softness and absorbency.

In other embodiments, the base web is formed by uncreped through-air dried process. Related uncreped through-air dried tissue processes are described for example, in U.S. Pat. Nos. 5,656,132 and 6,017,417.

The fibrous structures in accordance with the present invention may be in the form of through-air dried fibrous structures, differential density fibrous structures, differential basis weight fibrous structures, wet laid fibrous structures, air laid fibrous structures, creped or uncreped fibrous structures, pattern-densified or non-pattern-densified fibrous structures, compacted or un-compacted fibrous structures, double re-creped fibrous structures as well known in the art as exemplified in U.S. Pat. Nos. 3,301,746, 3,974,025, 4,191,609 and 4,637,859, 6,398,906 and 8,388,803.

The absorbent towel paper web of the present disclosure have a Machine Direction and a Cross-Machine Direction orthogonal to the Machine Directions. "Machine Direction" (MD) and "Cross Machine Direction" (CD) as used herein are defined as follows. The "Machine Direction" of the paper web is the direction within the plane of the paper web that is parallel with the length of the paper making machine. The "Cross Machine Direction" of the paper web is the direction within the plane of the paper web that is perpendicular to the length of the paper making machine and therefore orthogonal to the Machine Direction. Total dry tensile is the sum of the machine direction and cross machine direction tensile.

As use herein, the phrase "papermaking furnish" refers to aqueous mixture of either cellulosic or non-cellulosic fibers, paper making functional aids (strength, absorbency or softness improvement), fillers and other paper making process materials that are used to form the papermaking web. The cellulosic fibers envisioned are standard, "market" available materials sold as soft wood pulp fibers, such as Bleached SoftWood Kraft, hard wood pulp fiber, such as Bleached Hardwood Kraft, non-wood fiber, recycled fiber, synthetic polymer fibers and or bleached eucalyptus kraft pulp, and do not include fibrous materials that have been modified to enhance surface bonding characteristics such as enhanced carboxylated fibers that is taught in U.S. Pat. No. 6,379,494 or similar methods of fiber modification.

The absorbent towel paper webs of the present disclosure comprise from about 20% to about 90%, preferably from about 30% to about 80%, more preferably from about 40% to about 70%, and even more preferably from about 50% to about 60% of a refined soft wood pulp fiber mixture comprising soft wood pulp fiber and cationic strengthening polymer.

As used herein the phrase "percent (%) by weight of the dry fiber basis" refers to the percentage of referenced ingredient, including any carrier and/or delivery vehicle versus the dry final fiber web once all water and other volatile materials are removed from the papermaking web.

"Fiber", as used herein, means an elongate physical structure having an apparent length greatly exceeding it apparent diameter, i.e. a length to diameter ratio of at least about 10 and less than 200. Fibers having a non-circular cross-section and/or tubular shape are common; the "diameter" in this case may be considered to be the diameter of a circle having cross-sectional are equal to the cross-sectional area of the fiber. More specifically, as used herein, "fiber" refers to fibrous structure-making fibers. The present invention contemplates the use of a variety of fibrous structure-making fibers, such as, for example, natural fibers, such as cellulose nanofilaments and/or wood pulp fibers, non-wood fibers or any suitable fibers and any combination thereof.

Natural fibrous structure-making fibers useful in the present invention include animal fibers, mineral fibers, plant fibers, man-made spun fibers, and engineered fibrous elements such as cellulose nanofilaments. Animal fibers may, for example be selected from the group consisting of wool, silk, and mixtures thereof. The plant fibers may, for example, be derived from a plant selected from the group consisting of wood, cotton, cotton linters, flax, sisal, abaca, hemp, hesperaloe, jute, bamboo, bagasse, esparto grass, straw, jute, hemp, milkweed floss, kudzu, corn, sorghum, gourd, agave, trichomes, loofah and mixtures thereof.

Wood fibers; often referred to as wood pulps are liberated from their source by any one of a number of chemical pulping processes familiar to one experienced in the art, including kraft (sulfate), sulfite, polysulfide, soda pulping, etc. Further, the fibers can be liberated from their source using mechanical and semi-chemical processes including, for example, roundwood, thermomechanical pulp, chemomechanical pulp (CMP), chemi-thermomechanical pulp (CTMP), alkaline peroxide mechanical pulp (APMP), neutral semi-chemical sulfite pulp (NSCS), are also contemplated. The pulp can be whitened, if desired, by any one or combination of processes familiar to one experienced in the art including the use of chlorine dioxide, oxygen, alkaline peroxide, and so forth. Chemical pulps, however may be preferred since they impart superior tactile feel and/or desired tissue sheet properties. Pulps derived from both deciduous trees (hereinafter, referred to "hardwood") and coniferous trees (hereinafter, also referred to as "softwood") may be utilized and/or fibers derived from non-woody plants along with man-made fibers. The hardwood, softwood, and/or non-wood fibers can be blended, or alternately, can be deposited in layers to provide a stratified and/or layered web. U.S. Pat. Nos. 4,300,981 and 3,994,771 disclose layering of softwood and hardwood fibers. Also applicable to the present invention are fibers derived from recycled paper, as well as other non-fibrous materials, such as adhesives used to facilitate the original papermaking and paper converting. The wood pulp fibers may be short (typical of hardwood fibers) or long (typical of softwood fibers and some non-wood fibers).

Examples of softwood fibers that can be used in the paper towel webs of the present invention include but are not limited to fibers derived from pine, spruce, fir, tamarak, hemlock, cypress, and cedar. Softwood fibers derived from the kraft process and originating from more-northern climates may be preferred. These are often referred to as northern bleached softwood kraft (NBSK) pulps.

The soft wood pulp fiber mixture of the absorbent towel paper web of the present disclosure comprises from about 18.5% to about 88.5%, preferably from about 25% to about 75%, more preferably from about 35% to about 65%, and even more preferably from about 45% to about 55% by weight of the dry fiber basis of towel paper web of soft wood pulp fiber.

The soft wood pulp fiber may optionally be treaded to enhance bonding before addition to the soft wood pulp fiber mixture. This preparation of fibers my include mechanical refining treatment whereby the fibers are either compressed and/or subjected to high shear to make the fibers more flexible and create increased fiber to fiber bonding area through fiber fibrillation, fiber swelling and increased fiber flexibility. Refining may be performed by any means known by those skilled in the arts of papermaking. It has been unexpectedly learned that mechanical refining could be less than about 20 kilowatt-hours per bone dry ton (kWh/bdt), preferably less than about 10 kWh/bdt, and more preferably the fiber is not refined while still delivering enhanced wet strength while maintaining constant chemical addition and maintaining paper web dry strength.

The optional treatment to enhance fiber bonding may be achieved by chemical treatment or "chemical refining" also known in the pulp and papermaking arts to increase fiber to fiber bonding area through fiber fibrillation, fiber swelling thereby also increasing fiber flexibility.

Non-limiting examples of short hardwood fibers include fibers derived from a fiber source selected from the group consisting of acacia, eucalyptus, maple, oak, aspen, birch, cottonwood, alder, ash, cherry, elm, hickory, poplar, gum, walnut, locust, sycamore, beech, catalpa, sassafras, gmelin, albizia, and magnolia.

The absorbent towel paper web comprises rom about 10% to about 55%, preferably 20% to about 45%, more preferably from about 30% to about 40% of a hard wood pulp fiber mix, comprising hard wood pulp.

Different embodiments of the absorbent towel paper webs of the present invention may also comprise additional pulp fibers as long as their respective surface is not modified.

Recycle fiber may be added to the furnish in any amount. While any suitable recycle fiber may be used, recycle fiber with relatively low levels of groundwood is preferred in many cases, for example, recycle fiber with less than 15% by weight lignin content, or less than 10% by weight lignic content may be preferred depending on the furnish mixture employed and the application.

"Synthetic polymer fiber" and like terminology refer to fiber made from synthetic polymers such as polyesters, nylons and polyolefins and so forth. Polyesters are generally obtained by known polymerization techniques from aliphatic or aromatic dicarboxylic acids with saturated aliphatic or aromatic diols. Preferred aromatic diacid monomers are the lower alkyl esters such as the dimethyl esters of terephthalic acid or isophthalic acid. Typical aliphatic dicarboxylic acids include adipic, sebacic, azelaic, dodecanedioic acid or 1,4-cyclohexanedicarboxylic acid. The preferred aromatic dicarboxylic acid or its ester or anhydride is esterified or trans-esterified an polycondensed with the saturated aliphatic or aromatic diol. Typical saturated aliphatic diols preferably include the lower alkane-diols such as ethylene glycol. Typical cycloaliphatic diols include 1,4-cyclohexane diol and 1,4-cyclohexane dimethanol. Typical aromatic diols include aromatic diols such as hydroquinone, resorcinol and the isomers of napthalene diol (1,5-; 2,6-; and 2,7-). Various mixtures of aliphatic and aromatic dicarboxylic acids and saturated aliphatic and aromatic diols may also be used. Most typically, aromatic dicarboxylic acids are polymerized with aliphatic diols to produce polyesters, such as polyethylene terephthalate (terephthalic acid+ethylene glycol). Additionally, aromatic dicarboxylic acids can be polymerized with aromatic diols to produce wholly aromatic polyesters, such as polyphenylene terephthalate (terephthalic acid+hydroquinone). Examples of polyesters include; polyethylene terephthalate; poly(1,4-butylene)terephthalate; and 1,4-cyclohexylene dimethylene terephthalate/isophthalate copolymer and other linear homopolymer esters derived from aromatic dicarboxylic acids, including isophthalic acid, bibenzoic acid, naphthalene-dicarboxylic acid including the 1,5-; 2,6-; and 2,7-naphthalene-dicarboxylic acids; 4,4,-diphenylene-dicarboxylic acid; bis(p-carboxyphenyl)methane acid; ethylene-bis-p-benzoic acid; 1,4-tetramethylene bis(p-oxybenzoic) acid; ethylene bis(p-tetramethylene acid; 1,3-trimethylene bis(p-oxybenzoic) acid; and 1,4-tetramethylene bis(p-oxybenzoic) acid, and diols selected from the group consisting of 2,2-dimethyl-1, 3-propane diol; cyclohexane dimethanol and aliphatic glycols of the general formula $HO(CH_2)_nOH$ where n is an integer from 2 to 10, e.g., ethylene glycol; 1,4-tetramethylene glycol; 1,6-hexamethylene glycol; 1,8-octamethylene glycol; 1,10-decamethylene glycol; and 1,3-propylene glycol; and polyethylene glycols of the general formula $HO(CH_2CH_2O)_nH$ where n is an integer from 2 to 10,000, and aromatic diols such as hrydroquinone, resorcinol and the isomers of naphthalene diol (1,5-; 2,6-; and 2,7). There can also be present one or more aliphatic dicarboxylic acids, such as adipic, sebacic, azelaic, dodecanedioic acid or 1,4-cyclohexanedicarboxylic acid.

Suitable polyolefin resins include material made by polymerizing such olefins as ethylene, propylene, butene-1, pentene-1,4-methylpent-1-ene, etc., in conventional manner. Useful polyolefins for fibers are high-density polyethylene (HDPE) and polypropylene. Other polyolefin homopolymers and copolymers of ethylene can be utilized in the practice of this invention. Such other polyolefins include low-density polyethylene (LDPE), very low-density polyethylene (VLDPE), linear low-density polyethylene (LLDPE) and polybutylene (PB). However, these other polyolefins can be blended with other polyolefins such as polypropylene or high-density polyethylene (HDPE).

Nylon or polyamide resins useful in the practice of the invention are well-known in the art and include semi-crystalline and amorphous resins, which may be produced for example by condensation polymerization of equimolar amounts of saturated dicarboxylic acids containing from 4 to 12 carbon atoms with diamines, by ring opening polymerization of lactams, or by copolymerization of polyamides with other components, e.g. to form polyether polyamide block copolymers. Examples of polyamides include polyhexamethylene adipamide (nylon 66), polyhexamethylene azelaamide (nylon 69), polyhexamethylene sebacamide (nylon 610), polyhexamethylene dodecanoamide (nylon 612), polydodecamethylene dodecanoamide (nylon 1212), polycaprolactam (nylon 6), polylauric lactam, poly-11-aminoundercanoic acid, and copolymers of adipic acid, isophthalic acid, and hexamethylene diamine.

Synthetic polymer fibers are generally hydrophobic as compared with cellulose and lack anionic sites for bonding to wet strength resins or enough hydroxyl groups to hydrogen bond effectively to pulp-derived fiber. Suitable fibers used in connection with this invention include melt-spun fibers, melt-blown fibers, splittable fibers having multiple segments and especially segmented bicomponent fibers which are splittable into their segments by refining in a disk refiner. One suitable fiber available from Fiber Innovation Technology is a 16-segment, 2-denier nylon/polyester bicomponent fiber having a characteristic fineness of 0.125 denier, discussed below.

Segmented fiber preparation for making splittable fibers is generally known in connection with thermoplastic fibers, where fibers having segments formed of different polymers. See, for example U.S. Pat. No. 5,759,926 to Pike et al., as well as U.S. Pat. No. 5,895,710 to Sasse et al. and United States Patent Application Publication No. 2003/0203695 (U.S. patent application Ser. No. 10/135,650) of Polanco et al.

The splittable fibers produced and utilized in connection with this invention may have a segmented pie shape, an island in the sea configuration, a side-by-side configuration, a hollow configuration and so forth. See U.S. Pat. No. 4,735,849 to Murakami et al., FIGS. 6A-6D, as well as United States Patent Application Publication No. US 2002/0168912 (U.S. patent application Ser. No. 09/852,888), FIGS. 2-9. Splittable fibers are suitably integrated prior to incorporation into the furnish as is discussed below.

Manmade fibers also contemplated for this invention are formed by using a cellulosic dope prepared via multiple solvents know by one skilled in the art. This dope is spun into fibers which can be used or further fibrillated and incorporated into the absorbent sheet. Not to be limited to theory, a synthetic cellulose such as Lyocell is considered along with modified Lyocell that has been reduced in size via refining and other methods to create smaller fibers and fiber segments. U.S. Pat. No. 7,718,036 shows various considered solvents and the inclusion of fibrillated losel in a tissue and towel structure.

During the preparation of fibers for a paper making operation, long fiber and some short fiber pulps are subjected to mechanical or chemical processing whereby the fibers are either compressed, subjected to high shear and/or chemically treated to make the fibers more flexible and create increased fiber to fiber bonding are through fiber fibrillation, fiber swelling and increased fiber flexibility. Those skilled in the art will recognize three predominate products of refining a pulp fiber are; 1) a percentage fibers are not impacted at all depending upon refining intensity and consistency, 2) a significant percentage of fibers are fibrillated whereby the fiber cell wall is delaminated and microfibrils are exposed that remain bound to the original fiber, and 3) a percentage of fibers and microfibers are cut or mechanically broken into very small pieces (less than 200 microns in length) and this fraction is referred to as the fines fraction. These fines can either primary (those that exist in the native wood source) or secondary (those created during the act of refining). What has been discovered is that that by altering refining intensity, consistency and other processing conditions, a new fiber constituent can be created called cellulose nanofilaments and by optimizing the processing stages and unit operations a resultant pulp fiber stream containing greater 40% of individualized cellulose nanofilaments can be produced.

These "cellulose nanofilaments" may be used in embodiments of the present invention. They may be derived from either softwood and/or hardwood and as such may contain fibrous elements of the softwood or hardwood. The cellulose nanofilament size and high aspect ratio distinguish this material as a unique fiber class and not characterized as either a softwood or hardwood material. By high aspect ratio it is meant a fiber length divided by fiber width of at least 200 to about 5000, preferably greater than about 600 to about 1000. The cellulose nanofilament has an average width in the nanometer range, for example an average width of about 30 nm to about 500 nm, and an average length in the micrometer range or above, for example an average length above about 10 um, preferably from about 100 um to about 2 mm, more preferably from about 200 um to about 1 mm, and even more preferably from about 300 um to about 500 um. Such cellulose nanofilaments can be obtained, for example, from a process which uses mechanical means only, for example, the methods disclosed in U.S. patent application Publication no. 2013/0017394, file Jan. 19, 2012. In addition, cellulose nanofilaments can be made from a variety of processes as long as the specific geometry is maintained. Processes used to create cellulose nano filaments include but are not limited to modified refining equipment, homogenizers, sonic fiber treatment, and chemical fiber treatment including enzymatic fiber modification.

In the paper "*Nanocellulose Patent Trends: A Comprehensive Review on Patents on Cellulose Nanocrystals, Microfibrillated and Bacterial Cellulose*", Charreau et al, Nanotechnology, 2013, 7, 56-80, the author reviews the various terms to refer to microfibrillated cellulose (MFC) over the years and "cellulose nanofilaments" could fit into these general terms. The "cellulose nanofilament" material of the present disclosure is specifically the result of the process disclosed in publication US20130017394 A1 entitled "High aspect ratio cellulose nanofilaments and method for their production", Hua, X., et al. The material produced by this process is unique in that the process disclosed produces cellulose nanofilaments with aspect rations (length/width) significantly higher than previously disclosed materials.

The cellulose nanofilaments are structurally very different from other cellulose fibrils such as microfibrillated cellulose (MFC) or nanofibrillated cellulose (NFC) prepared using other methods for mechanical disintegration of wood pulp fibers in that they have at least 40%, preferably 75% and more preferably 90% by weight of the filaments of the fibrillated cellulose material have a filament length up to 300-350 um and diameters of approximately 100-500 nm. The fibrillated cellulose material in NFC typically has lengths shorter than 100 um while the fibrillated cellulose material in NFC typically has lengths shorter than 1 um. However it should be recognized by those skilled in the art that in the production of cellulose nanofilaments material, like other fibrillated cellulose materials produced using mechanical means are not homogeneous material with one single dimension value. The cellulose nanofilament material described above and the preferred blend of a refined pulp stream containing >50% cellulose nanofilaments within a refined pulp stream are the basis for this invention.

Another envisioned application of cellulose nanofilaments possible in embodiments contemplated in this invention is the inclusion of a small percentage of either pure cellulose nanofilaments and/or a mixture of cellulose nanofilaments and other refining products to a virgin or recycled pulp stream before being shipped to a paper making site. In this way a virgin fiber source can be enhanced via cellulose nanofilament addition and then the cellulose nanofilaments can be added to a paper making process without introducing a new fiber dosing stream. By dosing cellulose with nanofilaments at a pulp production facility one could produce what could be termed a "super pulp" with characteristics only possible through cellulose nanofilament inclusion. Therefore, many different methods for cellulose monofilament addition are considered in the invention and these include but are not limited to direct pure cellulose nanofilament inclusion, including a mixture of cellulose nanofilaments and other refining byproducts with a preferred nanocellulose content of greater than 50% and cellulose nanofilaments being added via inclusion in virgin or recycled fiber before inclusion at the paper mill.

The phrase "Fibrillated cellulose fibers" as use herein, are cellulosic fibers that have undergone mechanical or chemical treatment during which individual or bundles of cellulosic filaments are liberated from the body of the fiber but remain joined to the fiber on one end creating more binding area and increased fiber to fiber contact. The degree of treatment determines the number of cellulose nanofilaments that have been released from the fiber.

As used herein, the phrase "non-cellulosic fibers" means the group of paper making fibers that are composed of either natural or man-made fibers that are composed of materials other than cellulose. Non-cellulosic fibers include but are not limited to man-made spun fibers, fibers from animal sources, and/or micro-algae. Additionally, fibers forming the products of the present invention may be spun from polymer melt compositions via suitable spinning operations, such as meltblowing and/or spinbonding and/or they may be obtained from natural sources. Such fibers may be mono-component and/or multicomponent. For example, the fibrous elements may comprise bicomponent fibers and/or filaments. The bicomponent fibers and/or filaments may be in any form, such as side-by-side, core and sheath, islands-in-the-sea and the like. Non-limiting examples of filaments include meltblown and/or spunbound filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but are not limited to thermoplastic polymer filaments, such as polyesters, nylons, polyolefins such as polypropylene filaments, polyethylene filaments, and biodegradable thermoplastic fibers such as polyactic acid filaments, polyhydroxyalkanoate filaments, polyesteramide filaments and polycaprolactone filaments. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers. Staple fibers may be produced by spinning a filament tow and then cutting the two into segments of less than 5.08 cm (2 in.) thus producing fibers.

As used herein, the phrase "cellulosic fines", means the class of fibers materials that have a length of less than 200 microns. These materials can include primary, or naturally occurring materials in a tree, or they can be classified as secondary, those created by either pulping and/or handling of pulp fibers and therefore can contain fiber sections and/or cellulose nanofilaments sections. Fines are not a homogenous material and are only used to represent a class of material with a defined length limitation.

Preferred embodiments of the absorbent towel paper webs of the present disclosure comprise from about 0.05 to about 20.0%, preferably from about 1.0% to about 10.0%, and more preferably from about 2.0% to about 5.0% of cellulose nanofilaments.

The cationic strengthening polymers useful in this invention include without limitation cationic water soluble resins. These resins impart wet strength to paper sheets and are well known in paper making art. Such resins include polyamide epichlorohydrin (PAE), urea-formaldehyde resins, melamine formaldehyde resins, polyacrylamide resins, dialdehyde starches, and mixtures thereof.

In some embodiments, other strength agents can be utilized to further enhance the strength of a tissue product. As used herein, a "wet strength agent" is any material that, when added to pulp fibers can provide a resulting web or sheet with a wet geometric tensile strength to dry geometric tensile strength ration in excess of about 0.1. Typically these are termed either "permanent" wet strength or "temporary" wet strength agents. As is well known in the art, temporary and permanent wet strength agents may also sometimes function as dry strength agents to enhance the strength of the tissue product when dry. The listing of optional chemical ingredients are intended to barely exemplary in nature, and are not meant to limit the scope of the invention. Other materials may be included as well so long as they do not interfere or counteract the advantages of the present invention.

Wet strength agents may be applied in various amounts, depending on the desired characteristics of the web. For instances, in some embodiments, the total wet strength agents added can be between about 0.5 to 50 kg/T in some embodiments, between 2 to about 15 kg/T, and in some embodiments, between about 3 to about 5 kg/T of the strength agents can be incorporated into any layer of the multi-layer tissue web. The cationic wet strength resins useful in this invention include without limitation cationic water soluble resins. These resins impart wet strength to paper sheets and are well known in paper making art. This resiN may impart either temporary or permanent wet strength to the fibrous sheet. Such resins include polyamide epichlorohydrin (PAE), urea-formaldehyde resins, melamine, formaldehyde resins, polyacrylamide resins, dialdehyde starches, and mixtures thereof.

The strength additive may be selected from the group consisting of permanent wet strength resins, temporary wet strength resins, dry strength additives, and mixtures thereof. If permanent wet strength is desired, the chemical papermaking additive can be chosen from the following group of chemicals: polyamidpichlorohydrin, polyacrylamides, insolubilized polyvinyl alcohol; ureaormaldehyde; polyethyleneimine; and chitosin polymers. Polyamideepichlorohydrin resins are cationic wet strength resins which have been found to be of particular utility. Suitable types of such resins are described in U.S. Pat. No. 3,700,623, issued on Oct. 24, 1972, and U.S. Pat. No. 3,772,076, issued on Nov. 13, 1973, both issued to Keim. One commercial source of a useful polyamideepichlorohydrin resins is Solenos LLC. of Wilmington, Del., which markets such resin under the trademark KYMENE® 557H.

Polyacrylamide resins have also been found to be of utility as wet strength resins. These resins are described in U.S. Pat. No. 3,556,932, issued on Jan. 19, 1971, to Coscia, et al. and U.S. Pat. No. 3,556,933, issued on Jan. 19, 1971, to Williams et al. One commercial source of polyacrylamide resins to Kemira Oyj of Helsinki, Finland, which markets one such resin under the marketed as Fennorez.

Still other water-soluble cationic resins finding utility in this invention are urea formaldehyde and melamine formaldehyde resins. The more common functional groups of these polyfunctional resins are nitrogen containing groups such as amines groups and methylol groups attached to nitrogen. Polyethylenimine type resins may also find utility in the present invention.

If temporary wet strength is desired, the chemical papermaking additive can be chosen from the following group of chemicals: cationic dialdehyde starch-based resin (such as Caldas produced by Japan Carlet, National Starch 78-0080 or Cobond 1000, both produced by National Starch and Chemical Corporation); and dialdehyde starch. Modified starch temporary wet strength resins are also described in U.S. Pat. No. 4,675,394, Solarek, et al. issued Jun. 23, 1987. Preferred temporary wet strength resins include those described in U.S. Pat. No. 4,981,557 issued on Jan. 1, 1991, to Bjorkquist. Another example of a preferred temporary wet strength resin is Fennorez, a commercially available modified polyacrylamide resiN manufactured by Kemira Oyj of Helsinki, Finland. If dry strength is desired, the chemical papermaking additive can be chosen from the following group of chemicals. Polyacrylamide (such as combinations of Cypro 514 and ACCOSTRENGTH 711 produced by American Cyanannd of Wayne, N.J.): starch (such as corn starch or potato starch); polyvinyl alcohol (such as AIRVOL 540 produced by Air Products Inc of Allentown, Pa.); guar or locust bean gums; and/or carboxymethyl cellulose (such as Calexes from CPKelco, Atlanta, Ga.). In general, suitable starch for practicing the present invention is characterized by water solubility, and hydrophilicity. Exemplary starch materials include corn starch and potato starch, albeit it is not intended to thereby limit the scope of suitable starch materials; and waxy corn starch that is known industrially as amioca starch is particularly preferred. Amioca starch differs from common corn starch in that it is entirely amylopectin, whereas common corn starch contains both amplopectin and amylose. Various unique characteristics of amioca starch are further described in "Amioca—The Starch From Waxy Corn", H. H. Schopmeyer, Food Industries, December 1945, pp. 106-108 (Vol, pp. 1476-1478). The starch can be in granular or dispersed form albeit granular form is preferred. The starch is preferably sufficiently cooked to induce swelling of the granules. More preferably, the starch granules are swollen, as by cooking, to a point just prior to dispersion of the starch granule. Such highly swollen starch granules shall be referred to as being "fully cooked." The conditions for dispersion in general can vary depending upon the size of the starch granules, the degree of crystallinity of the granules, and the amount of amylose present. Fully cooked amioca starch, for example, can be prepared by heating an aqueous slurry of about 4% consistency of starch granules at about 190° F. (about 88° C.) for between about 30 and about 40 minutes. Other exemplary starch materials which may be used include modified cationic starches such as those modified to have nitrogen containing groups such as amino groups and methylol groups attached to nitrogen, available from National Starch and Chemical Company, (Bridgewater, N.J.). Such modified starch materials have heretofore been used primarily as a pulp furnish additive to increase wet and/or dry strength. However, when applied in accordance with this invention by application to a tissue paper web they may have reduced effect on wet strength relative to wet-end addition of the same modified starch materials. Considering that such modified starch materials are more expensive than unmodified starches, the latter have generally been preferred. These wet and dry strength resins may be added to the pulp furnish in addition to being added by the process described in this invention. It is to be understood that the addition of chemical compounds such as the wet strength and temporary wet strength resins discussed above to the pulp furnish is optional and is not necessary for the practice of the present development.

In preferred embodiments of the process of the present invention, the cationic strengthening polymer is added to the furnish in an amount ranging from about 0.25% to about 5.0%, preferably from about 0.5% to about 3.0%, more preferably from about 1.0% to about 2.0% by weight of the dry fiber basis of the absorbent towel or sanitary tissue product being produced. In general, processes to manufacture absorbent towel products add higher levels of polymers where the polymer is added up to about 5.0%, preferably up to about 3.0% and more preferably up to about 1.5%. Conversely, processes to produce sanitary tissue products add slightly lower levels of strengthening polymers where the polymer is added up to about 3.0% and preferably up to about 1.5%.

It is understood and contemplated in the present disclosure that polymer and polymer solutions may be produced now or in the future that have a higher concentration or activity level than those currently available to paper making manufacturers, that could result in embodiments that would be equivalent to the absorbent towel paper webs at levels below the limitations disclosed in the present disclosure.

The fibrous structure of the present disclosure may be homogeneous or may be layered. If layered, the fibrous structures may comprise at least two and/or at least three and/or at least four and/or at least five layers.

"Basis weight as used herein is the weight per unit area of a sample reported in lbs/3000 ft$^2$ or g/m$^2$. The fibrous towel structures and/or or sanitary tissue products of the present invention may exhibit a basis weigh of between 10 g/m2 to about 120 g/m2 and/or from about 14 g/m2 to about 80 g/m2 and/or from about 20 g/m2 to about 60 g/m2.

Basis weight is measured by preparing one or more samples of a certain area (m$^2$) and weighing the sample(s) of a fibrous structure according to the present invention and/or a paper product comprising such fibrous structure on a top loading balance with a minimum resolution of 0.01 g. The balance is protected from air drafts and other disturbances using a draft shield.

Weights are recorded when the readings on the balance become constant. The average weight (g) is calculated and the average area of the samples (m$^2$). The basis weight (g/m$^2$) is calculated by dividing the average weight (g) by the average area of the samples (m$^2$).

"Sanitary tissue product" as used herein means a soft low density (i.e. less than about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product prepared according to the present disclosure may be subjected to any suitable post processing including, but not limited to priming, embossing, calendaring, slitting, folding, combining with other fibrous structures and/or winding, and the like.

In a preferred embodiment of the absorbent towel paper web, the fibrous structure comprises from about 20% to 90% percent by weight of a refined softwood pulp fiber mixture. The long fiber softwood pulp fiber mixture comprises from about 18.5% to about 88.5% by weight of the dry fiber basis of the towel product of a soft wood pulp, wherein the soft wood pulp is optionally refined or not refined prior to combination with a cationic strengthening polymer. The cationic strengthening polymer is added to the aqueous stream in a manner that enables from about 0.25% to about 5.0% by weight of the polymer to be added to the paper making furnish. After combination of the soft wood pulp and cationic polymer, from about 0.05% to about 20% by weight of the dry fiber basis of the towel paper web of cellulose nanofilaments are blended into the stream. In this embodiment of the invention this soft wood fiber, cellulose nanofilament and cationic stream is then blended with 10% to 55% by weight of the dry fiber basis of the towel product with of hardwood pulp fiber mixture and formed into the fibrous sheet by any of the processes discussed above. The absorbent towel paper has a Mean Square Dry Tensile index of from about 6 N·m/g to about 12 N·m/g, a Total Dry Tensile Strength value ranging from about 300 N/m to about 600 N/m, and a Cross-directional Wet Tensile Strength to Cross-directional Dry Tensile Strength Ratio of from about 0.20 to about 0.50.

Other embodiments of the absorbent towel paper web that comprise the cellulose nanofilaments may have a Cross-directional Wet Tensile Strength to Cross-directional Dry Tensile Strength Ratio of from about 0.25 to about 0.35.

In another embodiment of the invention, the soft wood fiber stream is fed into a separate layer or layers of the paper making system and isolated from the 10 to 55% by weight hardwood pulp fiber stream. This process embodiment produces a higher strength absorbent towel web product having a Mean Square Dry Tensile index of from about 6 N·m/g to about 12 N·m/g and a Cross-directional Wet Tensile Strength to Cross-directional Dry Tensile Strength Ratio of from about 0.295 to about 0.35.

The absorbent paper towel webs of the present application also comprise of a cationic strengthening polymer. Generally, cationic strengthening polymers may be applied in various amounts, depending on the desired characteristics of the web. For instance, in some embodiments, the total wet strength agents added can be between about 0.5 to 50 kg/T in some embodiments, between 2 to about 15 kg/T, and in some embodiments, between about 3 to about 5 kg/T. The strength polymers can be incorporated into any layer of the multi-layer tissue web.

Optional Ingredients—Chemical Papermaking Additives:

If desired, various chemical additive compositions may optionally be added to the absorbent paper towel web to further enhance consumer desired benefits such as softness, lower lint, absorbency, and/or sheet flexibility. The chemical additives are selected from the group consisting of debonders, silicon softening additives, non-silicon softening additives, non-cationic strengthening additives, absorbency additives and aesthetic additives.

Debonders—

A chemical debonder can also be applied to soften the web. Specifically, a chemical debonder can reduce the amount of hydrogen bond within one or more layers of the web, which results in a softer product. Depending upon the desired characteristics of the resulting tissue product, the debonder can be applied in an amount between 0% to about 3.0%, preferably from about 0.1 to about 2.0% and more preferably from about 0.5 to about 1.0% by weight of the dry fiber basis of the paper web. The debonder can be incorporated into any layer of the single or multilayer tissue web.

Suitable debonders for use as softener additives in the present invention include both cationic and noncationic surfactants, with cationic surfactants being preferred. Noncationic surfactants include anionic, nonionic, amphoteric, and zwitterionic surfactants. Preferably, the surfactant is substantially nonmigratory in situ after the tissue paper has beeN manufactured in order to substantially obviate post-manufacturing changes in the tissue paper's properties which might otherwise result from the inclusion of surfactant. This may be achieved, for instance, through the use of surfactants having melt temperatures greater than the temperatures commonly encountered during storage, shipping, merchandising, and use of tissue paper product embodiments of the invention: for example, melt temperatures of about 50° C. or higher.

The level of noncationic surfactant applied to tissue paper webs to provide the aforementioned softness/tensile benefit ranges from the minimum effective level needed for imparting such benefit, on a constant tensile basis for the end product, to about 2%; preferably between about 0.01% and about 2% noncationic surfactant is retained by the web; more preferably, between about 0.05% and about 1.0%; and, most preferably, between about 0.05% and about 0.3%. The surfactants preferably have alkyl chains with eight or more carbon atoms. Exemplary anionic surfactants are linear alkyl sulfonates, and alkylbenzene sulfonates. Exemplary nonionic surfactants are alkylglycosides including alkylglycoside esters such as CRODESTA® SL-40 which is available from Croda, Inc. (New York, N.Y.); alkylglycoside ethers as described in U.S. Pat. No. 4,011,389, issued to W. K. Langdon, et al. oN Mar. 8, 1977; alkylpolyethoxylated esters such as PEGOSPERSE® 200 available from Glyco Chemicals, Inc. (Greenwich, Conn.); alkylpolyethoxylated ethers and esters such as NEODOLR 25-12 available Shell Chemical Co; sorbitan esters such as SPAM 60 from ICI America, Inc, ethoxylated sorbitan esters, propoxylated sorbitan esters, mixed ethoxylated propoxylated sorbitan esters, and polyethoxylated sorbitan alcohols such as TWEEN 60 also from ICI America, Inc. Alkylpolyglycosides are particularly preferred for use in the present invention. The above listings of exemplary surfactants are intended to be merely exemplary in nature, and are not meant to limit the scope of the invention.

Silicons—

If a chemical softener that functions primarily by imparting a lubricous feel is desired a polysiloxane or "silicon" can be used. Depending upon the desired characteristics of the resulting tissue product, the silicon can be applied in an amount between 0% to about 3.0%, preferably from about 0.1 to about 2.0% and more preferably from about 0.5 to about 1.0% by weight of the dry fiber basis of the paper web. The silicon can be incorporated into any layer of the single or multilayer tissue web. Suitable silicon compounds for use in the present invention are described in detail below.

The polysiloxane compounds preferably have monomeric siloxane units of the following structure:

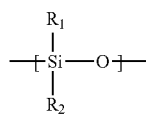

wherein, R1 and R2, for each independent siloxane monomeric unit can each independently be hydrogen or any alkyl, aryl, alkenyl, alkaryl, arakyl, cycloalkyl halogenated hydrocarbon, or other radical. Any of such radicals can be substituted or unsubstituted, R1 and R2 radicals of any particular monomeric unit may differ from the corresponding functionalities of the next adjoining monomeric unit. Additionally, the polysiloxane can be either a straight chain, a branched chain or have a cyclic structure. The radicals R1 and R2 can additionally independently be other siliceous functionalities such as, but not limited to siloxanes, polysiloxanes, silanes, and polysilanes. The radicals R1 and R2 may contain any of a variety of organic functionalities including, for example, alcohol, carboxylic acid, aldehyde, ketone and amine, amide functionalities, with amino functional silicone compounds being preferred. Exemplary alkyl radicals are methyl, ethyl, propyl, butyl, pentyl, hexyl, octyl, decyl, octadecyl, and the like. Exemplary alkenyl radicals are vinyl, allyl, and the like. Exemplary aryl radicals are phenyl, diphenyl, naphthyl, and the like. Exemplary alkaryl radicals are toyl, xylyl, ethylphenyl, and the like. Exemplary arakyl radicals are benzyl, alpha-phenylethyl, beta-phenylethyl, alpha-phenylbutyl, and the like. Exemplary cycloalkyl radicals are cyclobutyl, cyclopentyl, cyclohexyl, and the like. Exemplary halogenated hydrocarbon radicals are chloromethyl, bromoethyl, tetrafluoroethyl, fluoroethyl, trifluoroethyl, trifluorotoyl, hexafluoroxylyl, and the like. References disclosing polysiloxanes include U.S. Pat. No. 2,826,551, issued Mar. 11, 1958 to Geen; U.S. Pat. No. 3,964,500, issued Jun. 22, 1976 to Drakoff; U.S. Pat. No. 4,364,837, issued Dec. 21, 1982, Pader, U.S. Pat. No. 5,059,282, issued Oct. 22, 1991 to Ampulski et al.; and British Patent No. 849,433, published Sep. 28, 1960 to Woolston. Also, Silicon Compounds, pp 181-217, distributed by Petrarch Systems, Inc., 1984, contains an extensive listing and description of polysiloxanes in general.

Strength Additives—

The strength additive may be applied to the tissue paper web alone, simultaneously with, prior to, or subsequent to the addition of softener, absorbency, and/or aesthetic additives. At least an effective amount of a strength additive, preferably starch, to provide lint control and concomitant strength increase upon drying relative to a non-binder treated but otherwise identical sheet is preferably applied to the sheet. Preferably, between about 0.01% and about 2.0% of a strength additive is retained in the dried sheet, calculated on a dry fiber weight basis; and, more preferably, between about 0.1% and about 1.0% of a strength additive material, preferably starch-based, is retained.

Softening Additives—

Any surfactant other than the chemical papermaking additive emulsifying surfactant material, is hereinafter referred to as "surfactant," and any surfactant present as the emulsifying component of emulsified chemical papermaking additives is hereinafter referred to as "emulsifying agent". The surfactant may be applied to the tissue paper alone or simultaneously with, after, or before other chemical papermaking additives. In a typical process, if another additive is present, the surfactant is applied to the cellulosic substrate simultaneously with the other additive(s). It may also be desirable to treat a debonder containing tissue paper with a relatively low level of a binder for lint control and/or to increase tensile strength.

If a chemical softener that functions primarily by imparting a lubricous feel is desired, it can be chosen from the following group of chemicals. Organic materials (such as mineral oil or waxes such as parafin or carnuba, or lanolin); and polysiloxanes (such as the compounds described in U.S. Pat. No. 5,059,282 issued to Ampulski). Suitable polysiloxane compounds for use in the present invention are described in detail below.

If a chemical softened that functions primarily by plasticizing the structure is desired, it can be chosen from the following group of chemicals: polyethylene glycol (such as PEG 400); dimethylamine; and/or glycerine.

If a cationic chemical softener that functions primarily by debonding is desired, it can be chosen from the following group of chemicals. Cationic quaternary ammonium compounds (such as dihydrogenated tallow dimethyl ammonium methyl sulfate (DTDMAMS) or dihydrogenated tallow dimethyl ammonium chloride (DTDMAC) both produced by Witco Corporation of Greenwich, Conn.; Berocel 579 (produced by Eka Nobel of Stennungsund, Sweden); materials described in U.S. Pat. Nos. 4,351,699 and 4,447,294 issued to Osborn; and/or diester derivatives of DTDMAMS or DTDMAC.) In particular, quaternary ammonium compounds having the formula:

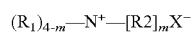

m is 1 to 3;

each $R_1$ is a $C_1$-$C_8$ alkyl group, hydroxyalkyl group, hydrocarbyl or substituted hydrocarbyl group, alkoxylated group, benzyl group, or mixtures thereof; each $R_2$ is a $C_9$-$C_{41}$ alkyl group, hydroxyalkyl group, hydrocarbyl or substituted hydrocarbyl group, alkoxylated group, benzyl group, or mixtures thereof; and X⁻ is any softener-compatible anion are suitable for use in the present invention. Preferably, each $R_2$ is $C_{16}$-$C_{18}$ alkyl, most preferably each $R_2$ is straight-chain $C_{18}$ alkyl. Preferably, each $R_1$ is methyl and X⁻ is chloride or methyl sulfate. Optionally, the $R_2$ substituent can be derived from vegetable oil sources. Biodegradable ester-functional quaternary ammonium compound having the formula:

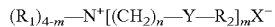

each Y=—O—(O)C—, or —C(O)—O—;
m=1 to 3; preferably, m=2;
each n=1 to 4; preferably, n=2;
each $R_1$ substituent is a short chain $C_1$-$C_6$, preferably $C_1$-$C_3$, alkyl group, e.g., methyl (most preferred), ethyl, propyl, and the like, hydroxyalkyl group, hydrocarbyl group, benzyl group or mixtures thereof; each $R_2$ is a long chain, at least partially unsaturated (IV of greater than about 5 to less than about 100, preferably from about 10 to about 85), $C_{11}$-$C_{23}$ hydrocarbyl, or substituted hydrocarbyl substituent and the counter-ion, X⁻, can be any softened compatible anion, for example, acetate, chloride, bromide, methylsulfate, formate, sulfate, nitrate and the like can also be used in the present invention. Preferably, the majority of $R_2$ comprises fatty acyls containing at least 90% $C_{18}$-$C_{24}$ chainlength. More preferably, the majority of $R_2$ is selected from the group consisting of fatty acryls containing at least 90% $C_{18}$, $C_{22}$ and mixtures thereof.

Other types of suitable quaternary ammonium compounds are described in European Patent No. 0 688 901 A2, assigned to Kimberly-Clark Corporation, published Dec. 12, 1995.

Tertiary amine softening compounds can also be used in the present invention. Examples of suitable tertiary amine softeners are described in U.S. Pat. No. 5,399,241, assigned to James River Corporation, issued Mar. 21, 1995.

Absorbency Additives

If enhanced absorbency is desired, surfactants may be used to treat the paper webs of the present invention. The level of surfactant, if used, in one embodiment, can be from about 0.01% to about 2% by dry fiber weight basis of the tissue web. In one embodiment the surfactants have alkyl chains with eight or more carbon atoms. Alternatively, cationic softener active ingredients with a high degree of unsaturation (mono and/or poly) and/or branched chain alkyl groups can greatly enhance absorbency.

If an absorbency aid is desired that enhances the rate of absorbency it can be chosen from the following group of chemicals: polyethoxylates (such as PEG 400); alkyl ethoxylated esters (such as PEGOSPERSE 200 ML from Lonza Inc.); alkyl ethoxylated alcohols (such as Neodol); alkyl polyethoxylated nonylphenols (such as IGEPAL CO produced by Rhone-Poulenc/GAF), ethoxylate trimethyl pentanediol, and/or materials described in U.S. Pat. Nos. 4,959,125 and 4,940,513 issued to Spendel. In those instances where the surfactant debonder softener decreases wetting, a wetting agent, e.g., a second surfactant, may be added to the application solution. For example, a sorbitan stearate ester can be mixed with an alkyl polyethoxylated alcohol to produce a soft wettable paper.

Water soluble polyhydroxy compounds can also be used as absorbency aids and/or wetting agents. Examples of water soluble polyhydroxy compounds suitable for use in the present invention include glycerol, polyglycerols having a weight average molecular weight of from about 150 to about 800 and polyoxyethylene and polyoxypropylene having a weight-average molecular weight of from about 200 to about 4000, preferably from about 200 to about 1000, most preferably from about 200 to about 600. Polyoxyethylene having an weight average molecular weight of from about 200 to about 600 are especially preferred. Mixtures of the above-described polyhydroxy compounds may also be used. For example, mixtures of glycerol and polyglycerols, mixtures of glycerol and polyoxyethylenes, mixtures of polyglycerols and polyoxyethylenes, etc. are useful in the present invention. A particularly preferred polyhydroxy compound is polyoxyethylene having an weight average molecular weight of about 400. This material is available commercially from the Union Carbide Company of Danbury, Conn. under the trade name "PEG-400".

If an absorbency aid is desired that decreases the rate of absorbency it can be chosen from the following group of chemicals. Alkylketenedimers (such as AQUAPELR 360XC EmulsionN manufactured by Hercules Inc., Wilmington, Del.); fluorocarbons (such as Scotch Guard by 3M of Minneapolis, Minn.) hydrophobic silicones (such as PDMS DC-200 by Dow Corning of Midland, Mich.), fluorotelomers (such as ZONYL 7040 by Dupont of Wilmington, Del.), etc.

The absorbency additive can be used alone or in combination with a strength additive. Starch based strength additives have been found to be the preferred binder for use in the present invention. Preferably, the tissue paper is treated with an aqueous solution of starch. In addition to reducing linting of the finished tissue paper product, low levels of starch also imparts a modest improvement in the tensile strength of tissue paper without imparting boardiness (i.e., stiffness) which would result from additions of high levels of starch. Also, this provides tissue paper having improved strength/softness relationship compared to tissue paper which has been strengthened by traditional methods of increasing tensile strength: for example, sheets having increased tensile strength due to increased refining of the pulp; or through the addition of other dry strength additives. This result is especially surprising since starch has traditionally been used to build strength at the expense of softness in applications wherein softness is not an important characteristic: for example, paperboard. Additionally, parenthetically, starch has been used as a filler for printing and writing paper to improve surface printability.

Aesthetic Additives

If an aesthetic additive is desired, it can be chosen from the following group of chemicals: inks; dyes; perfumes; opacifiers (such as TiO2 or calcium carbonate), optical brighteners, and mixtures thereof. The aesthetics of the paper can also be improved utilizing the process described in this invention. Inks, dyes, and/or perfumes are preferably added to the aqueous composition which is subsequently applied to the tissue paper web. The aesthetics additive may be applied alone or in combination with the wetting, softening, and/or strength additives.

The paper webs of the present disclosure have high dry tensile strength. The paper webs have a Mean Square Dry Tensile index ranging from about 6 N·m/g to about 12 N·m/g. Preferred embodiments paper webs have a Mean Square Tensile ranging from about 7 N·m/g to about 10 N·m/g. As measured separately, the paper webs of the present disclosure have a Total Dry Tensile Strength ranging from about 300 N/m to about 600 N/m for a single ply, with preferred single-ply embodiments having a Dry Tensile Strength ranging from about 350 N/m to about 500 N/m.

The single ply paper webs produced on the paper machine of the present disclosure also have high Cross-directional (CD) wet tensile strength. The paper webs of the present disclosure have a Cross-directional Wet Tensile Strength to Cross-directional Dry Tensile Strength Ratio ranging from about 0.20 to about 0.50 N/m, with preferred embodiments having a CD Wet Tensile Strength to CD Dry Tensile Strength Ratio ranging from about 0.295 to about 0.35.

Process for Making

In FIG. 1, a twin wire former having a papermaking headbox 1 injects or deposits a furnish of an aqueous suspension of papermaking fibers onto a plurality of forming fabrics, such as the outer forming fabric 5 and the inner forming fabric 3, thereby forming a wet tissue web 6. The forming process of the present disclosure may be an conventional forming process known in the papermaking industry. Such formation processes include, but are not limited to, Fourdriniers, roof formers such as suction breast roll formers, and gap formers such as twin wire formers and crescent formers.

The wet tissue web 6 forms on the inner forming fabric 3 as the inner forming fabric 3 revolves about a forming roll 4. The inner forming fabric 3 serves to support and carry the newly-formed wet tissue web 6 downstream in the process as the wet tissue web 6 is partially dewatered to a consistency of about 10 percent based on the dry weight of the fibers. Additional dewatering of the wet tissue 6 may be carried out by known paper making techniques, such as vacuum suction boxes, while the inner forming fabric 3 supports the wet tissue web 6. The wet tissue web 6 may be additionally dewatered to a consistency of at least about 20 percent, more specifically between 20 to about 40 percent, and more specifically about 20 to about 30 percent.

The forming fabric 3 can generally be made from any suitable porous material, such as metal wires or polymeric filaments. For instance, some suitable fabrics can include, but are not limbed to, Albany 84M and 94M available from Albany International (Albany, N.Y.) Asten 856, 866, 867, 892, 934, 939, 959, or 937; Asten Synweve Design 274, all of which are available from Asten Forming Fabrics, Inc. (Appleton, Wis.); and Voith 2164 available from Voith Fabrics (Appleton, Wis.). Forming fabrics or felts comprising nonwoven base lasers may also be useful, including those of Scapa Corporation made with extruded polyurethane foam such as the Spectra Series.

The wet web 6 is then transferred from the forming fabric 3 to a transfer fabric 8 while at a solids consistency between about 10 to about 40 percent, and particularly, between about 20 to about 30 percent. As used herein, a "transfer fabric" is a fabric that is positioned between the forming section and the drying section of the web manufacturing process.

Transfer to the transfer fabric 8 may be earned out with the assistance of positive and/or negative pressure. For example, in one embodiment, a vacuum shoe 9 can apply negative pressure such that the forming fabric 3 and the transfer fabric 8 simultaneously converge and diverge at the leading edge of the vacuum slot. Typically, the vacuum shoe 9 supplies pressure at levels between about 10 to about 25 inches of mercury. As stated above, the vacuum transfer shoe 9 (negative pressure) cars be supplemented or replaced by the use of positive pressure from the opposite side of the web to blow the web onto the next fabric. In some embodiments, other vacuum shoes can also be used to assist in drawing the fibrous web 6 onto the surface of the transfer fabric 8.

Typically, the transfer fabric 8 travels at a slower speed than the forming fabric 3 to enhance the MD and CD stretch of the web, which generally refers to the stretch of a web in its cross (CD) or machine direction (MD) (expressed as percent elongation at sample failure). For example, the relative speed difference between the two fabrics can be from about 1 to about 30 percent, in some embodiments from about 5 to about 20 percent, and in some embodiments, from about 10 to about 15 percent. This is commonly referred to as "rush transfer". During "rush transfer", many of the bonds of the web are believed to be broken, thereby forcing the sheet to bend and fold into the depressions on the surface of the transfer fabric 8. Such molding to the contours of the surface of the transfer fabric 8 may increase the MD and CD stretch of the web. Rush transfer from one fabric to another can follow the principles taught in any one of the following parents, U.S. Pat. Nos. 5,667,636, 5,830,321, 4,440,597, 4,551,199, 4,849,054.

The wet tissue web 6 is then transferred from the transfer fabric 8 to a through-air dry big fabric 11. Typically, the transfer fabric 8 travels at approximately the same speed as the through-air drying fabric 11. However, it has now been discovered that a second rush transfer may be performed as the web is transferred from the transfer fabric 8 to a through-air drying fabric 11. This rush transfer is referred to herein as occurring at the second position and is achieved by operating the through-air drying fabric 11 at a slower speed than the transfer fabric 8. By performing rush transfer at two distinct locations, i.e., the first and the second positions, a tissue product having increased CD stretch may be produced.

In addition to rush transferring the wet tissue web from the transfer fabric 8 to the through-air drying fabric 11, the wet tissue web 6 may be macroscopically rearranged to conform to the surface of the through-air drying fabric 11 with the aid of a vacuum transfer roll 12 or a vacuum transfer shoe like the vacuum shoe 9. If desired, the through-air drying fabric 11 can be run at a speed slower than the speed of the transfer fabric 8 to further enhance MD stretch of the resulting absorbent tissue product. The transfer may be carried out with vacuum assistance to ensure conformation of the wet tissue web 6 to the topography of the through-air drying fabric 11.

While supported by the through-air drying fabric 11, the wet tissue web 6 is dried to a final consistency of about 94 percent or greater by a through-air dryer 13. The web 15 then passes through the winding nip between the reel drum 22 and the reel 23 and is wound into a roll of tissue 25 for subsequent converting, such as slitting cutting, folding, and packaging.

The web is transferred to the through-air drying fabric for final drying preferably with the assistance of vacuum to ensure macroscopic rearrangement of the web to give the desired bulk and appearance. The use of separate transfer and through-air drying fabrics can offer various advantages since it allows the two fabrics to be designed specifically to address key product requirements independently. For example, the transfer fabrics are generally optimized to allow efficient conversion of high rush transfer levels to high MD stretch while through-air drying fabrics are designed to deliver bulk and CD stretch. It is therefore useful to have moderately coarse and moderately three-dimensional transfer fabrics and though-air drying fabrics which are quite coarse and three dimensional in the optimized configuration. The result is that a relatively smooth sheet leaves the transfer section and then is macroscopically rearranged (with vacuum assist) to give the high bulk, high CD stretch surface topology of the through-air drying fabric. Sheet topoplogy is completely changed from transfer to through-air drying fabric and fibers are macroscopically rearranged, including significant fiber-fiber movement.

The drying process can be any noncompressive or comprehensive drying method which tends to preserve the bulk or thickness of the wet web including, without limitation, through-air drying, infra-red radiation, microwave drying, Valmet NTT, Voith ATMOS, etc. Because of its commercial availability and practicality, through-air drying is well known and is one commonly used means for noncompressively drying the web for purposes of this invention. Suitable through-air drying fabrics include, without limitation, fabrics with substantially continuous machine direction ridges whereby the ridges are made up of multiple warp strands grouped together, such as those disclosed in U.S. Pat. No. 6,998,024. Other suitable through-air drying fabrics include those disclosed in U.S. Pat. No. 7,611,607, particularly the fabrics denoted as Fred (t1207-77), Jeston (t1207-6) and Jack (t1207-12). The web is preferably dried to final dryness on the through-air drying fabric, without being pressed against the surface of a Yankee dryer, and without subsequent creping.

Once the wet tissue web 6 has been non-compressively dried, thereby forming the dried tissue web 15, it is possible to crepe the dried tissue web 15 by transferring the dried tissue web 15 to a Yankee dryer prior to reeling, or using alternative foreshortening methods such as microcreping as disclosed in U.S. Pat. No. 4,919,877.

New Tissue Technology—NTT

Figure 2:
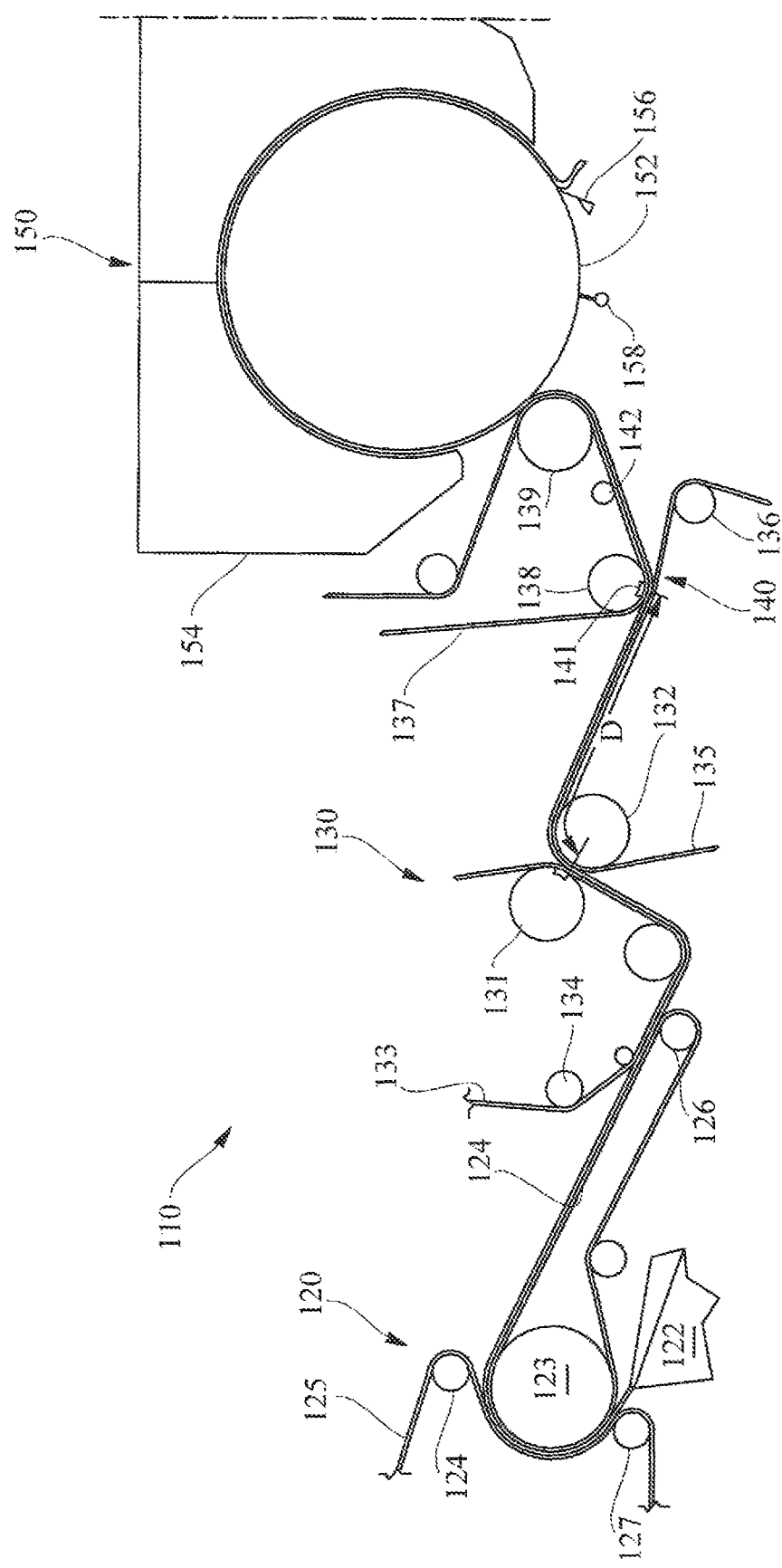
FIG. 2 is a schematic diagram of an alternative "New Tissue Technology" ("NTT") process for making a multi-density absorbent towel web product for use in the present disclosure.

A papermaking machine 110 is illustrated in FIG. 2. The papermaking machine comprises a wet section or forming section 120, a press section 130 and a drying section 150. The wet section 120 comprises a headbox 122, a forming roll 123, an endless inner clothing 124, and an endless outer clothing 125 consisting of a forming wire. The inner and outer clothings 124 and 125 run in separate loops around several guide rolls 126 and 127 respectively.

The drying section 150 comprises a heated drying cylinder 152, which is covered by a hood 154. The drying cylinder and hood collectively can comprise a Yankee dryer. At the outlet side of the drying section, a creping doctor 156 is arranged to crepe the fibrous web off the drying cylinder 152. An application device 158 is provided for applying a suitable adhesive or other composition on the envelope surface of the drying cylinder 152. The resulting creped web is thereafter rolled into a parent roll (not shown) for subsequent conversion into the final product form as desired.

The press section 130 comprises at least one press, which has two cooperating first and second press members 131 and 132, which press members together define a press nip. Further, the press section comprises an endless press felt 133 that runs in a loop around the first press member 131 and guide rolls 134, and an endless impermeable transfer belt 135. The transfer belt 135 runs in a loop around the second press member 132 and a plurality of guide rolls 136. A suction roll (not numbered) is also shown in FIG. 1, within the loop of the felt 133 at a location where the felt 133 overlaps with the inner clothing 124, upstream of the press nip. This suction roll dewaters the felt 133 and the paper web prior to the press nip. For example, the suction roll can operate at a vacuum of about 40 kPa, whereby the paper web entering the press nip can have a dry solids content of about 15% to 20%.

In the embodiment shown in FIG. 2, the press is a shoe press in which the first press member comprises a shoe press roll 131 and the second press member comprises a counter roll 132. The shoe press roll and the counter roll define an extended press nip there between. Other types of presses can be used instead of a shoe press.

The papermaking machine further comprises a permeable final fabric 137 arranged to run in a loop around a suction transfer device 138 located adjacent to the transfer belt 135 to define a transfer point 140 for transfer of the paper web from the transfer belt 135 to the final fabric 137. The transfer point 140 is located at a distance D from the press nip, as measured along the path traversed by the transfer belt 135. The suction transfer device 138 forms a suction zone 141 operable to exert suction through the final fabric 137 to transfer the paper web from the transfer belt 135 onto the final fabric 137. In the case of manufacturing a structured tissue web, the final fabric comprises a structuring fabric (or "texturizing fabric") having a structured surface, and the suction exerted by the suction transfer device 138 further serves to mold the damp tissue web to the structured surface of the fabric. The "structuring fabric" can have about 25 or fewer machine direction-oriented knuckles or other raised surface features per square centimeter. The fabric 137 runs around a transfer roll 139, which defines a non-compressing nip with the drying cylinder 152 for transfer of the tissue web from the fabric 137 onto the drying cylinder 152.

In the embodiment shown in FIG. 1, the suction transfer device 138 is a suction roll having a suction zone 141 that encompasses a predetermined sector angle. The transfer belt 135 is arranged to partially wrap the curved outer surface of the suction device 138. As an alternative to a roll, the suction transfer device could be another type of suction device such as a suction shoe having a curved outer surface, or a suction box having a non-curved suction surface of a defined length L.

The characteristics of the transfer belt 135 and the arrangement of the transfer belt 135 in relation to the structuring fabric 137 and suction transfer device 138 are of particular importance in the case of the manufacture of low-basis-weight tissue webs, such as tissue webs having a basis weight of about 20 grams per square meter (gsm) or less, more specifically from about 10 to about 20 gsm, still more specifically from about 10 to about 15 gsm. As used herein, "basis weight" refers to the amount of bone dry fiber in the web while positioned on the drying cylinder 152 during the tissue making process. This is to be distinguished from "finished" basis weight, which can be influenced by the presence of crepe folds that foreshorten the web in the machine direction. However, the basis weight of a tissue web on the dryer can be closely estimated from a finished basis weight by measuring the basis weight of the tissue web after all of the machine-direction foreshortening has been pulled out. Tissue webs having such low basis weight are particularly difficult to handle in a papermaking machine because a wet tissue web has virtually no tensile strength. As a consequence, the process of separating the tissue web from the transfer belt 135 and transferring it onto the structuring fabric 137 is complicated by the extremely low strength of the web.

More particularly, as the transfer belt 135 with the tissue web thereon exits the press nip formed by the press members 131, 132, a thin water film exists between the tissue web and the surface of the transfer belt 135. It is theorized that as long as this water film is intact, the tissue web cannot be separated from the transfer belt without significant risk of the web breaking. It has been found through multiple trials of transfer belts having different properties that the surface characteristics of the transfer belt play an important role in determining whether or not the tissue web can be separated from the transfer belt. Specifically, it has been found that some types of transfer belts make it difficult or essentially impossible to separate the tissue web, while other types of transfer belts allow the tissue web to be separated (as long as other criteria are also met, as further described below). Based on these trials, it is theorized that the transfer belts that permit the web to be separated somehow allow the thin water film to dissipate or break up after a certain period of time has elapsed after the web exits the press nip, while the transfer belts that do not permit the web to be separated without breaking do not allow the water film to dissipate.

In view of the trial results, it has been found that a papermaking machine such as the one depicted in FIG. 1 can be used for making tissue webs of low basis weight (as previously noted), as long as the transfer belt 135 has the proper surface characteristics that allow the water film to dissipate, and as long as there is a sufficient time period (referred to herein as the "dwell time" td) for the water film to dissipate. The dwell time is the period of time it takes for the web to travel the distance D from the press nip to the transfer point 140. The dwell time (in seconds) is related to the speed V of the transfer belt 135 (in meters per minute) by the equation td=(D/V)*60. Thus, for example, if V=1000 m/min and D=4 m, then $t_d$ is equal to 0.24 seconds.

Regarding the surface characteristics of the transfer belt 135, it has been found that a transfer belt whose web-contacting surface is formed by a substantially nonporous polymeric coating, and which may have a surface that is ground or sanded to increase its surface roughness to an arithmetic average roughness of about Ra=2 to 5 μm generally does not allow the tissue web to be separated from the transfer belt even when the distance D is made long enough to provide a dwell time $t_d$ of at least 0.5 s. It should be noted that for reasons of machine compactness it is usually desired to keep the distance D as small as possible while still allowing the tissue web transfer to be carried out reliably without breaking the web. Thus, based on the trials that have been done, it was determined that transfer belts with a substantially nonporous polymeric coating cannot be used, even if sanded to increase their surface roughness.

Advanced Tissue Molding System—ATMOS

The particular shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 3:
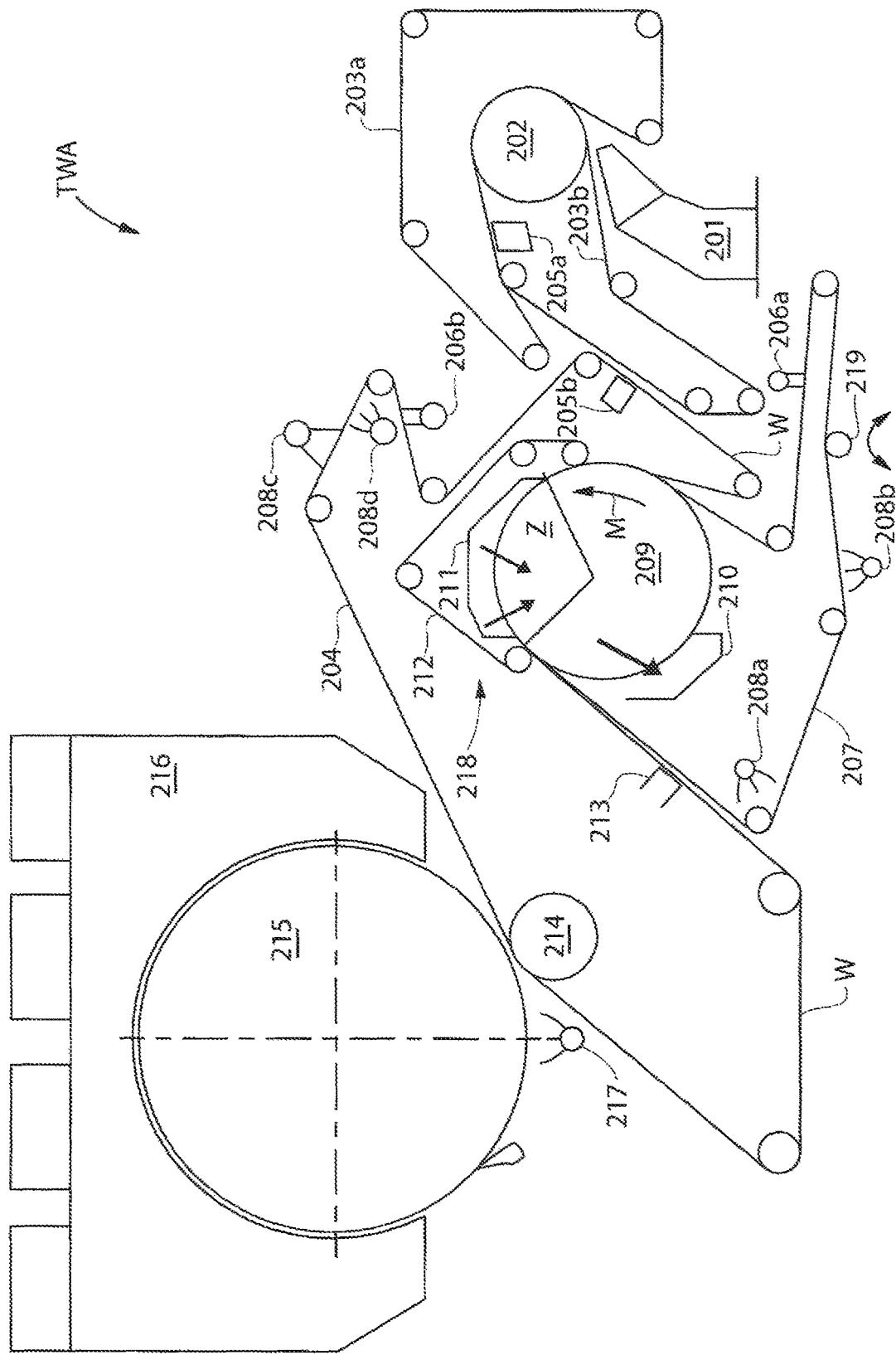
FIG. 3 is a schematic diagram of an Advanced Tissue Molding System "ATMOS" process for making a multi-density absorbent towel web product for use in the present disclosure.

Referring now to FIG. 3. there is shown a machine TWA for making a fibrous web W. e.g., a tissue, hygiene paper wed, etc., which can be, e.g. a twin wire ATMOS system for processing a fibrous web W. System TWA includes a headbox 201 which feeds a suspension to a twin wire former formed by an outer wire 203a, an inner wire 203b and a forming roll 202. The twin wire former can be of any conventionally known type and can preferably be of the type disclosed in e.g., U.S. patent application Ser. No. 11/189,884 filed on Jul. 27, 2005. Once the web W is formed by the twin wire former, the web W is conveyed by the inner wire 203b to a structured fabric 204. The web W is transferred to the structured fabric 204 from the inner wire 203b using a suction box 205 located at a pick-up area. The web W is conveyed by the structured fabric 204 to and through a pressing arrangement formed by a belt press assembly 218 composed of a permeable tension belt 212 and a vacuum roll 209. A dewatering fabric 207 also passes over the vacuum roll 209 and through the belt press assembly 218. The web W is dewatered in the extended belt press nip formed by the belt press assembly 218 and the vacuum roll 209 and is then carried by the structured belt 204 to a Yankee cylinder 215 and hood 216 arrangement and is transferred to the Yankee 215 using a press roll 214. A steam box and hot air blower arrangement 211 is arranged within the permeable tension belt 212 and is arranged over a suction zone Z of the vacuum roll 209. One or more saveralls 210 is utilized to collect moisture collected from the vacuum roll 209. The system also utilizes a number of guide rolls for each of the belts/fabrics, an adjusting roll 219 for the dewatering belt 207, a number of Uhle boxes 206a and 206b, a number of shower units 208a, 208b, 208c, and 208d, and an additional suction box or pick-up 213.

By way of non-limiting example, the outer wire 203a can be a conventional endless circulating wire and/or can be a DSP belt (e.g., of the type disclosed in U.S. Pat. No. 6,237,644. The outer wire 203a can also be any suitable conventional wire.

By way of non-limiting example, the inner wire 203b can be an endless circulating belt. The inner wire 203b can also be any suitable conventional wire.

By way of non-limiting example, the forming roll 202 can be a solid roll or an open roll. The roll 202 can also be any suitable conventional forming roll.

By way of non-limiting example, the belt press belt 212 can be a belt of the type disclosed in e.g., U.S. patent application Ser. No. 11/276,789 filed on Mar. 14, 2006. By way of example, the permeable belt 212 can have a paper web facing side and can be guided over a support surface of the roll 209 and can have the following characteristics: a tension of between approximately 20 kN/m and approximately 100 kN/m, a permeability value of between approximately 100 cfm and approximately 1200 cfm, a surface contact area of the paper web side that is between approximately 0.5% and approximately 90% when not under tension, and an open area of between approximately 1.0% and approximately 85%.

For example, the permeable belt 212 can preferably have the following characteristics: the belt 212 should resist the high MD (machine direction) tension forces over a long time period without stretching and without distortion of the monofilaments; the belt 212 should resist the effect of steam (and very hot water vapor) from the steam box that is in the ATMOS configuration, i.e., it should resist hydrolysis; the belt 212 should allow a sufficient volume of air through the paper sheet so that sufficient dryness (approximately 32" to approximately 35% or better) is achieved after the belt press as the web passes to the final drying at the Yankee drying and creping stage; the belt 212 should preferably have a suitable permeability and surface contact area, materials, and weave pattern as described herein; and the belt 212 should be part of a system or process that is efficient and economical way of drying tissue. The belt 212 can also be a belt press belt of the type disclosed in U.S. Ser. No. 10/972,408 filed on Oct. 26, 2004 and/or U.S. Ser. No. 10/972,431 filed on Oct. 26, 2004 and/or U.S. Ser. No. 10/768,485 filed on Jan. 30, 2004.

By way of non-limiting example, the dewatering fabric 207 can be a dewatering fabric of the type disclosed in e.g., U.S. patent application Ser. No. 11/380,835 filed Apr. 28, 2006, and can have the following characteristics and properties. By way of example, the dewatering fabric 207 can have a paper web facing side and can be guided over a support surface such as that of the roll 209 and can have the following characteristics: a caliper of between approximately 0.1 mm and approximately 15 mm, a permeability value of between approximately 1 cfm and approximately 500 cfm, an overall density of between approximately 0.2 g/cm³ and approximately 1.10 g/cm³, and a weight of between approximately 350 g/m² and approximately 3000 g/m². The caliper can also preferably be between approximately 2 mm and approximately 4 mm, the permeability value can preferably be between approximately 10 cfm and approximately 50 cfm, the overall density can preferably be between approximately 0.2 g/cm³ and approximately 1.10 g/cm³, and the weight can preferably be between approximately 900 g/m² and approximately 1300 g/m². The dewatering fabric 7 should also preferably have good compressibility.

According to one non-limiting embodiment of the invention, the formed web W is transferred to the structured fabric 204 using the suction box 205. This occurs while the structured fabric 204 and the inner wire 203b are ruing at different speeds, i.e., a speed differential is utilized between the belts 203b and 204. Preferably, the structured belt 204 is running at a slower speed than the inner wire 203b. The web W moves in a machine direction past the first suction box 205a and second suction box 205b. Using the vacuum boxes 205a and 205b, sufficient moisture can be removed from web W to achieve a solids level of between approximately 7% and approximately 25% on a typical or nominal 20 gram per square meter (gsm) web running. The vacuum at the box 205 can provide between approximately 0.2 to approximately −0.8 bar vacuum, with a preferred operating level of between approximately −0.4 to approximately −0.6 bar. As fibrous web W proceeds along the machine direction, m, it comes into contact with a dewatering fabric 207. The dewatering fabric 207 can be an endless circulating belt which is guided by a plurality of guide rolls. The tension of the fabric 207 can be adjusted by adjusting guide roll 219. The dewatering belt 207 can be a dewatering fabric or felt. The web W then proceeds toward vacuum roll 209 between the structured fabric 204 and the dewatering fabric 207. The vacuum roll 209 rotates along the machine direction, m and can be operated at a vacuum level of between approximately −0.2 to approximately −0.8 bar with a preferred operating level of at least approximately −0.4 bar, and most preferably approximately −0.6 bar. By way of non-limiting example, the thickness of the vacuum roll shell of roll 209 may be in the range of between approximately 25 mm and approximately 75 mm. The mean airflow through the web W in the area of the suction zone Z can be approximately 150 m³/min per meter of machine width at atmospheric pressure and at ambient temperature. The structured fabric 204, web W and dewatering fabric 207 are guided through a belt press 218 formed by the vacuum roll 209 and a permeable belt 212. As is shown in the figure, the permeable belt 212 is a single endlessly circulating belt which is guided by a plurality of guide rolls and which presses against the vacuum roll 209 so as to form the belt press 218.

The upper or structured fabric 204 is an endless fabric which transports the web W to and from the belt press system 218, from the twin wire former 202/203a/203b, and to the Yankee cylinder 215 for final drying. After being transferred from the twin wire former, the web W lies in the three-dimensional structure of the upper fabric 204, and therefore it is not flat but has also a three-dimensional structure, which produces a high bulky web. The lower fabric 207 is also permeable. The design of the lower fabric 207 is made to be capable of storing water. The lower fabric 207 can also have a smooth surface. The lower fabric 207 can preferably be a felt with a batt layer. The diameter of the batt fibers of the lower fabric 207 are equal to or less than approximately 11 dtex, and can preferably be equal to or lower than approximately 4.2 dtex, or more preferably be equal to or less than approximately 3.3 dtex. The batt fibers can also be a blend of fibers. The lower fabric 207 can also contain a vector layer which contains fibers from approximately 67 dtex, and can also contain even courser fibers such as, e.g., approximately 100 dtex, approximately 140 dtex, or even higher dtex numbers. This is important for the good absorption of water. The wetted surface of the batt layer of the lower fabric 207 and/or of the lower fabric itself can be equal to or greater than approximately 35 m²/m² felt area and can preferably be equal to or greater than approximately 65 m²/m² felt area and can most preferably be equal to or greater than approximately 100 m²/m² felt area. The specific surface of the lower fabric 207 can be equal to or greater than approximately 0.04 m²/g felt weight and can preferably be equal to or greater than approximately 0.065 m²/g felt weight and can most preferably be equal to or greater than approximately 0.075 m²/g felt weight. This is also important for the good absorption of water. The dynamic stiffness K*[N/mm] as a value for the compressibility can be acceptable if less than or equal to 100,000 N/mm, preferable compressibility is less than or equal to 90,000 N/mm, and most preferably the compressibility is less than or equal to 70,000 N/mm. The compressibility (thickness change by force in-mm/N) of the lower fabric 207 should be considered. This is important in order to dewater the web efficiently to a high dryness level. A hard surface would not press the web W between the prominent points of the structured surface of the upper fabric 204. On the other hand, the felt should not be pressed too deep into the three-dimensional structure to avoid losing bulk and therefore quality, e.g., water holding capacity.

Also by way of non-limiting example, the permeable belt 212 can be a single or multi-layer woven fabric which can withstand the high running tensions, high pressures, heat, moisture concentrations and achieve a high level of water removal required by the papermaking process. The fabric 212 should preferably have a high width stability, be able to operate at high running tensions, e.g., between approximately 20 kN/m and approximately 100 kN/m, and preferably greater than or equal to approximately 20 kN/m and less than or equal to approximately 60 kN/m. The fabric 212 should preferably also have a suitable high permeability and can be made of hydrolysis and/or temperature resistant material. The permeable high tension belt 212 forms part of a "sandwich" structure which includes a structured belt 204 and the dewatering belt 207. These belts 204 and 207, with the web W located there between, are subjected to pressure in the pressing device 218 which includes the high tension belt 212 arranged over the rotating roll 209. In other embodiments, the belt press 218 can be used in a device which utilizes a static extended dewatering nip instead of the rotating roll 209.

Referring back to the figure, the nip formed by the belt press 218 and roll 209 can have an angle of wrap of between approximately 30 degrees and 180 degrees, and preferably between approximately 50 degrees and approximately 140 degrees. By way of non-limiting example, the nip length can be between approximately 800 mm and approximately 2500 mm, and can preferably be between approximately 1200 mm and approximately 1500 mm. Also, by way of non-limiting example, the diameter of the suction roll 218 can be between approximately 1000 mm and approximately 2500 mm or greater, and can preferably be between approximately 1400 mm and approximately 1700 mm.

To enable suitable dewatering, the single or multilayered fabric 212 should preferably have a permeability value of between approximately 100 cfm and approximately 1200 cfm and is most preferably between approximately 300 cfm and approximately 800 cfm. The nip can also have an angle of wrap that is preferably between 50 degrees and 130 degrees. The single or multi-layered fabric or permeable belt 212 can also be an already formed (i.e., a pre-joined or seamed belt) an endless woven belt. Alternatively, the belt 212 can be a woven belt that has its ends joined together via a pin-seam or can be instead be seamed on the machine. The single or multi-layered fabric or permeable belt 212 can also preferably have a paper surface contact area of between approximately 0.5% and approximately 90% when not under pressure or tension. The contact surface of the belt 212 should not be altered by subjecting the belt to sanding or grinding. By way of non-limiting example, the belt 212 should have an open area of between approximately 1.0% and approximately 85%. The single or multi-layered fabric or permeable belt 212 can also be a woven belt having a paper surface warp count of between approximately 5 yarns/cm and approximately 60 yarns/cm, and is preferably between approximately 8 yarns/cm and approximately 20 yarns/cm, and is most preferably between approximately 10 yarns/cm and approximately 15 yarns/cm. Furthermore, the woven belt 212 can have a paper surface weft count of between approximately 5 yarns/cm and approximately 60 yarns/cm, and is preferably between approximately 5 yarns/cm and approximately 20 yarns/cm, and is most preferably between approximately 8 yarns/cm and approximately 17 yarns/cm.

Due to the high moisture and heat which can be generated in the ATMOS papermaking process, the woven single or multi-layered fabric or permeable belt 212 can be made of one or more hydrolysis and/or heat resistant materials. The one or more hydrolysis resistant materials can preferably be a PET monofilament and can ideally have an intrinsic viscosity value normally associated with dryer and TAD fabrics, i.e., in the range of between 0.72 IV and 1.0 IV. These materials can also have a suitable "stabilization package" including carboxyl end group equivalents etc. When considering hydrolysis resistance, one should consider the carboxyl end group equivalents, as the acid groups catalyze hydrolysis, and residual DEG or di-ethylene glycol as this too can increase the rate of hydrolysis. These factors separate the resin which should be used from the typical PET bottle resin. For hydrolysis, it has been found that the carboxyl equivalent should be as low as possible to begin with and should be less than 12. For DEG level, less than 0.75% should preferably be used. Even that this low level of carboxyl end groups, it is essential that an end capping agent be added. A carbodiimide should be used during extrusion to ensure that at the end of the process there are no free carboxyl groups. There are several classes of chemical that can be used to cap the end groups, such as epoxies, orthoesters and isocyanates, but, in practice, monomeric and combinations of monomeric with polymeric carbodiimindes are the best and most used. Preferably, all end groups are capped by an end capping agent that may be selected from the above-noted classes such that there are no free carboxyl end groups.

PPS can be used for the heat resistant materials. Other single polymer materials such as PEN, PBT, PEEK and PA can also be used to improve properties such as stability, cleanliness and life. Both single polymer yarns as well as copolymer yarns can be used.

The material used for the high tension belt 212 may not necessarily be made from monofilament, and can also be a multifilament, including the core and sheath. Other materials such as non-plastic materials can also be used, e.g., metal materials.

The permeable belt 212 need not be made of a single material and can also be made of two, three or more different materials, i.e., the belt 212 can be a composite belt. The permeable belt 212 can also be formed with an external layer, coating, and/or treatment which is applied by deposition and/or which is a polymeric material that can be cross linked during processing. Preferably, the coating enhances the fabric stability, contamination resistance, drainage, wearability, improved heat and/or hydrolysis resistance. It is also preferable if the coating reduces fabric surface tension to aide sheet release or to reduce drive loads. The treatment or coating can be applied to impart and/or improve one or more of these properties.

The permeable belt 212 does not necessarily require excellent contact area, i.e., one non-limiting example of a well performing belt 212 in an ATMOS system comprises a contact area of less than 10%. Ideally, the permeable belt 212 has a suitable permeability and surface contact area. The materials and weave of the belt are less important than such considerations.

By way of non-limiting example, the structured fabric 204 can be a structured fabric of the type disclosed in e.g., U.S. patent application Ser. No. 11/380,826 filed Apr. 28, 2006. By way of example, the structured fabric 204 can have a paper web facing side and can be guided over the support surface of the roll 209 and can have the following characteristics: a permeability value of between approximately 100 cfm and approximately 1200 cfm, a paper surface contact area of between approximately 5% and approximately 70% when not under pressure and tension, and an open area of between approximately 10% and approximately 90%.

Also by way of non-limiting example, the structured fabric 204 can be a single or multi-layered woven fabric which can withstand the high pressures, heat, moisture concentrations, and which can achieve a high level of water removal and also mold or emboss the paper web required by the Voith ATMOS paper making process. The fabric 204 should also have a width stability, a suitable high permeability. The fabric 204 should also preferably utilize hydrolysis and/or temperature resistant materials.

The fabric 204 is utilized as part of a sandwich structure which includes at least two other belts and/or fabrics. These additional belts include a high tension belt 212 and a dewatering belt 207. The sandwich structure is subjected to pressure and tension over an extended nip formed by a rotating roll 209 or static support surface. The extended nip can have an angle of wrap of between approximately 30 degrees and approximately 180 degrees and is preferably between approximately 50 degrees and approximately 130 degrees. The nip length can be between approximately 800 mm and approximately 2500 mm, and is preferably between approximately 1200 mm and approximately 1500 mm. The nip can be formed by a rotating suction roll having a diameter that is between approximately 1000 mm and approximately 2500 mm, and is preferably between approximately 1400 mm and approximately 1700 mm.

The structured fabric 204 imparts a topographical pattern into the paper sheet or web. To accomplish this, high pressures are imparted to the molding fabric 204 via a high tension belt 212. The topography of the sheet pattern can be manipulated by varying the specifications of the molding belt 204, i.e., by regulating parameters such as, yarn diameter, yarn shape, yarn density, and yarn type. Different topographical patterns can be imparted in the sheet by different surface weaves. Similarly, the intensity of the sheet pattern can be varied by altering the pressure imparted by the high tension belt 212 and by varying the specification of the molding belt 204. Other factors which can influence the nature and intensity of the typographical pattern of the sheet include air temperature, air speed, air pressure, belt dwell time in the extended nip, and nip length.

The following are non-limiting characteristics and/or properties of the structured fabric 204: to enable suitable dewatering, the single or multi-layered fabric should have a permeability value of between approximately 100 cfm and approximately 1200 cfm, and is preferably between approximately 200 cfm and approximately 900 cfm; the fabric 204 which is part of a sandwich structure with two other belts, e.g., a high tension belt 212 and a dewatering belt 207, is subjected to pressure and tension over a rotating or static support surface and at an angle of wrap of between approximately 30 degrees and approximately 180 degrees and preferably between approximately 50 degrees and approximately 130 degrees; the fabric 204 should have a paper surface contact area of between approximately 5% and approximately 70% when not under pressure or tension; the forming fabric should have an open area of between approximately 10% and approximately 90%. The fabric 204 is preferably a woven fabric that can be installed on an ATMOS machine as a pre-joined and/or seamed continuous and/or endless belt. Alternatively, the forming fabric 204 can be joined in the ATMOS machine using e.g., a pin-seam arrangement or can otherwise be seamed on the machine. In order to resist the high moisture and heat generated by the ATMOS papermaking process, the woven single or multi-layered belt 204 may utilize either hydrolysis and/or heat resistant materials. Hydrolysis resistant materials should preferably include a PET monofilament having an intrinsic viscosity value normally associated with dryer and TAD fabrics in the range of between 0.72 IV and approximately 1.0 IV and also have a suitable "stabilization package" which including carboxyl end group equivalents, as the acid groups catalyze hydrolysis and residual DEG or di-ethylene glycol as this too can increase the rate of hydrolysis. These two factors separate the resin which can be used from the typical PET bottle resin. For hydrolysis, it has been found that the carboxyl equivalent should be as low as possible to begin with and should be less than approximately 12. The DEG level should be less than approximately 0.75%. Even at this low level of carboxyl end groups it is essential that an end capping agent be added and should utilize a carbodiimide during extrusion to ensure that at the end of the process there are no free carboxyl groups. There are several classes of chemical than can be used to cap the end groups such as epoxies, ortho-esters, and isocyanates, but in practice monomeric and combinations of monomeric with polymeric carbodiimindes are the best and most used.

Heat resistant materials such as PPS can be utilized in the structured fabric 204. Other materials such as PEN, PBT, PEEK and PA can also be used to improve properties of the fabric 204 such as stability, cleanliness and life. Both single polymer yarns and copolymer yarns can be used. The material for the belt 204 need not necessarily be made from monofilament and can be a multi-filament, core and sheath, and could also be a non-plastic material, i.e., a metallic material. Similarly, the fabric 204 may not necessarily be made of a single material and can be made of two, three or more different materials. The use of shaped yarns, i.e., non-circular yarns, can also be utilized to enhance or control the topography or properties of the paper sheet. Shaped yarns can also be utilized to improve or control fabric characteristics or properties such as stability, caliper, surface contact area, surface planarity, permeability and wearability.

The structured fabric 204 can also be treated and/or coated with an additional polymeric material that is applied by e.g., deposition. The material can be added cross-linked during processing in order to enhance fabric stability, contamination resistance, drainage, wearability, improve heat and/or hydrolysis resistance and in order to reduce fabric surface tension. This aids in sheet release and/or reduce drive loads. The treatment/coating can be applied to impart/improve one or several of these properties of the fabric 204. As indicated previously, the topographical pattern in the paper web W can be changed and manipulated by use of different single and multi-layer weaves. Further enhancement of the pattern can be further attained by adjustments to the specific fabric weave by changes to the yarn diameter, yarn counts, yarn types, yarn shapes, permeability, caliper and the addition of a treatment or coating etc. Finally, one or more surfaces of the fabric or molding belt 204 can be subjected to sanding and/or abrading in order to enhance surface characteristics.

It is noted that the foregoing examples have been provided merely for the purpose of explanation and are in no way to be construed as limiting of the present invention. While the present invention has been described with reference to exemplary embodiments, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular arrangements, materials and embodiments, the invention is not intended to be limited to the particulars disclosed herein. Instead, the invention extends to all functionally equivalent structures, methods and uses, such as are within the scope of the appended claims.

Un-Creped Through Air Dried—UCTAD

Figure 4:
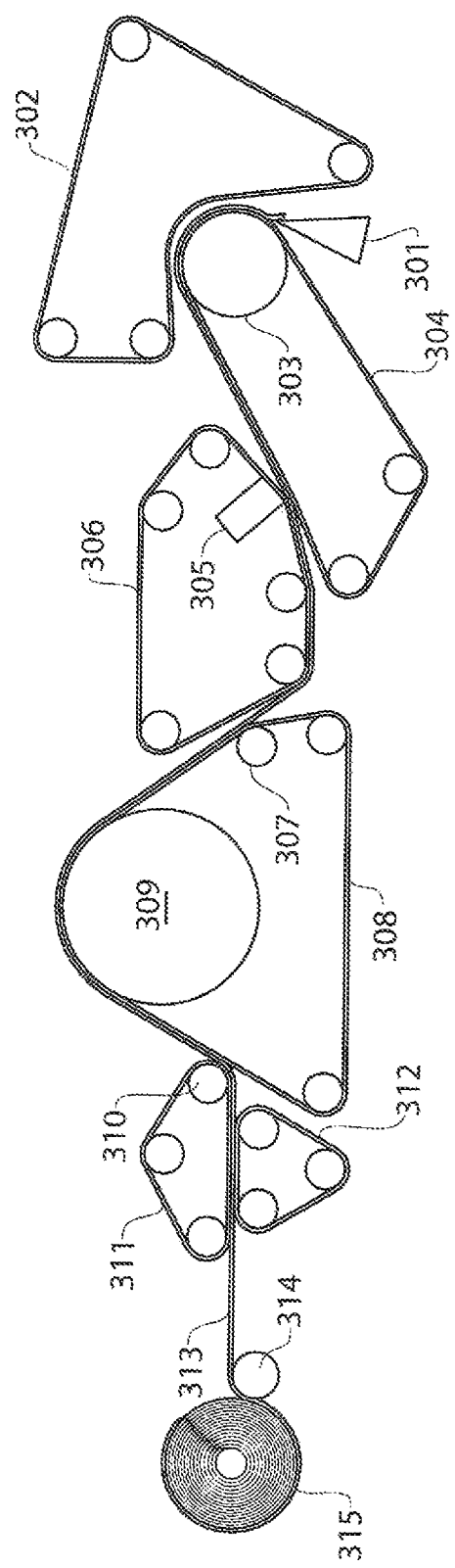
FIG. 4. is a schematic diagram of an Uncreped Though Air Dried Technology "UCTAD" process for making a multi-density absorbent towel web product for use in the present disclosure.

Referring to FIG. 4, a method of carrying out this invention will be described in greater detail. FIG. 4 describes a process for making uncreped through air dried base sheets suitable for off-line application of the heated compositions. Shown is a twin wire former having a layered papermaking headbox 301 which injects or deposits a stream of an aqueous suspension of papermaking fibers onto the forming fabric 302. The web is then transferred to fabric 304, which serves to support and carry the newly-formed wet web downstream in the process as the web is partially dewatered to a consistency of about 10 dry weight percent. Additional dewatering of the wet web can be carried out, such as by vacuum suction, while the wet web is supported by the forming fabric.

The wet web is then transferred from the forming fabric to a transfer fabric 306 traveling at a slower speed than the forming fabric in order to impart increased MD stretch into the web. A kiss transfer is carried out to avoid compression of the wet web, preferably with the assistance of a vacuum shoe 305. The web is then transferred from the transfer fabric to the through air drying fabric 308 with the aid of a vacuum transfer roll 307 or a vacuum transfer shoe. The through air drying fabric can be traveling at about the same speed or a different speed relative to the transfer fabric. If desired, the through air drying fabric can be run at a slower speed to further enhance MD stretch. Transfer is preferably carried out with vacuum assistance to ensure deformation of the sheet to conform to the through air drying fabric, thus yielding desired bulk, flexibility, CD stretch and appearance.

The level of vacuum used for the web transfers can be from about 3 to about 15 inches of mercury (75 to about 380 millimeters of mercury), preferably about 10 inches (254 millimeters) of mercury. The vacuum shoe (negative pressure) can be supplemented or replaced by the use of positive pressure from the opposite side of the web to blow the web onto the next fabric in addition to or as a replacement for sucking it onto the next fabric with vacuum. Also, a vacuum roll or rolls can be used to replace the vacuum shoe(s).

While supported by the through air drying fabric, the web is final dried to a consistency of about 94 percent or greater by the through air dryer 309 and thereafter transferred to an upper carrier fabric 311.

The dried base sheet 313 is transported between the upper and lower transfer fabrics, 311 and 312 respectively, to the reel 314 where it is wound into a roll 315 for subsequent printing of the heated composition and further converting.

EXAMPLES

Example 1: Absorbent Toweling

Absorbent towel paper webs were produced on a Through-Air Dried Tissue making paper machine or "Valmet Karlstad TAD" demonstration machine equipped with the following:

Forming Wire: Microline XP or similar and Thinline Q592 of equivalent,
TAD Fabric: Prolux 593 or equivalent homogeneous sheet,
Chemistry: PAE/CMC pH~8-9 ratio 3-4/1,
Refining of only long fiber. Target~550 CSF,
Northern Softwood Kraft: Mercer Celgar NBSK ("BNSK")
Hardwood Kraft: Euculyptus: Brazilian ("BEuc")
Cellulose Nanofilaments: As supplied from Kruger Canada
Target properties:
High and mid tier U.S. Toweling:
Basis Weight: 52 GSM
Total Tensile: 460-740 (N/m)
CD Tensile: 130-270 (N/m)
MD Tensile: 230-470 (N/m)
Tensile GMT 6.5-11 Nm/g
Total wet Tensile: 100-160 (N/m)
CD Wet tensile: 30-60 (N/m)
MD Wet Tensile: 45-100 (N/m)
Furnish Inclusion:
BNSK 55%
BEuc 45%
Cellulose Nanofilaments added to BNSK stream as BNSK replacement Part 1: Towel format. Hold process constant with the only change being the addition of cellulose nano filaments material at 2.5 and 5.0%. Following table shows the results:

| Condition | | 1 | 2 | 3 |
|---|---|---|---|---|
| NSK | (%) | 60 | 57.5 | 55 |
| Eucalyptus | (%) | 40 | 40 | 40 |
| NSK refining | kWh/t | 50 | 50 | 50 |
| PAE | kg/ton | 10 | 10 | 10 |
| CMC | kg/ton | 3.1 | 3.1 | 3.1 |
| Cellulose Nano filaments | (%) | 0 | 2.5 | 5.0 |
| Basis weight | gm2 | 25.7 | 26.2 | 26.2 |
| Tensile mean square | Nm/g | 8.58 | 9.91 | 10.8 |
| Tensile CD | N/m | 173 | 218 | 239 |
| Wet Tensile CD | N/m | 50.4 | 65 | 81.5 |
| Wet/Dry ratio | | 0.29 | 0.30 | 0.34 |

Observation: Holding paper making variables constant, the addition of CF predictably increases dry tensile from 173 to 239 N/M for the conditions listed above, but surprisingly increases the wet to dry tensile ratio from 0.29 to 0.34. This data was not expected from all previous information disclosed regarding CF fibers.

Part 2: Towel Format Reel Data when fee product was held constant at roughly the same total tensile value and refining was used as the control knob to keep at target.

| Condition | | A | B | C | D | E |
|---|---|---|---|---|---|---|
| NSK | (%) | 60 | 57.5 | 55 | 55 | 50 |
| Eucalyptus | (%) | 40 | 40 | 40 | 45 | 45 |
| NSK refining | kWh/t | 49.9 | 25.6 | 6.08 | 50.3 | 6.41 |
| PAE | kg/ton | 10 | 10 | 10 | 6 | 6 |
| CMC | kg/ton | 3.1 | 3.1 | 3.1 | 1.875 | 1.875 |
| Cellulose Nanofilament addition | (%) | 0 | 2.5 | 5.0 | 0 | 5 |
| Basis weight | g/m2 | 25.9 | 26.1 | 26.0 | 26.0 | 27.5 |
| Tensile mean square | Nm/g | 8.36 | 8.2 | 9.02 | 6.63 | 6.83 |
| Tensile MD | N/m | 290 | 291 | 332 | 233 | 228 |
| Tensile CD | N/m | 162 | 158 | 166 | 127 | 136 |
| Wet Tensile CD | N/m | 45 | 49.7 | 52.8 | 35.1 | 42.6 |
| Wet/Dry ratio | | 0.278 | 0.315 | 0.318 | 0.276 | 0.313 |

Observation: We were unsuccessful in holding the product tensile constant within a product group using only refining as the control knob within the time constraints of this experiment. Within process and test method variation, CD tensile was held constant with a range of only 162-166 N/m., but surprisingly CD wet tensile increased from 45 to 52.8 N/m and this surprisingly increased the wet to dry tensile ratio from 0.28 to 0.32. More surprising was the fact that wet tensile increased with reducing refining energy input as it is well documented that wet tensile generally increases with refining during normal refining control limits. This data was not expected from all previous information disclosed regarding cellulose filament fibers. For example, the soft wood pulp fiber can be refined at a delivered energy of less than about 25 kWh/bdt or less than about 10 kWH/bdt.

Analytical Test Methods

The following test methods are representative of the techniques utilized to determine the physical characteristics of the absorbent paper webs associated herewith.

1. Sample Conditioning and Preparation

All samples for testing are prepared in a conditioning environment generally following accepted standards for paper testing. The conditioning environment for samples have a creative humidity of approximately 50% and a temperature of approximately 74 degrees Fahrenheit.

2. Total Dry Tensile Strength

The Dry Tensile Strength characteristic of absorbent paper web sample of the present invention is determined by carrying out the test method published by the International Organization for Standardization, ISO 12625-4:2005, Tissue paper and tissue products—Part 4: Determination of tensile strength, stretch at break and tensile energy absorption. ISO 12625-4 is used to measure both Machine Direction (MD) and Cross-machine Direction (CD) Dry Tensile Strengths. The Total Dry Tensile Strength is the mathematical sum of the Machine Direction Dry Tensile Strength and the Cross-machine Direction Dry Tensile Strength.

3. Mean Square Dry Tensile Strength

Mean Square Dry Tensile Strength index is a calculated parameter derived from ISO 12625-4 results and is equivalent to the square root of the MD tensile index squared plus the CD tensile index squared. Mean Square Dry tensile may provide a more representative metric to evaluate overall sheet strength per unit mass.

4. Wet Tensile Strength

The Wet Tensile Strength characteristic of absorbent paper web sample of the present invention is determined by carrying out the test method published by the International Organization for Standardization, ISO 12625-5:2005, Tissue paper and tissue products—Part 5: Determination of wet tensile strength. ISO 12625-5 is used to measure both Machine Direction (MD) and Cross-machine Direction (CD) Wet Tensile Strengths.

5. CD Wet Tensile: CD Dry Tensile Ratio

The characteristic ratio of Cross-machine Direction Wet Tensile Strength to Cross-machine Direction Dry Tensile Strength is calculated as the mathematic ratio of the two characteristic parameters.

$$\text{Ratio} = \frac{CD \text{ Wet Tensile Strength}}{CD \text{ Dry Tensile Strength}}$$

When employed in the present disclosure, the terms "comprises", "comprising", and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The dimensions and values disclosed herein are not to be understood as being strictly limited to the exact dimension and values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An absorbent towel paper web having a differential density, a machine direction, and a cross-machine direction orthogonal to the machine direction, the absorbent towel paper web comprising a fibrous web comprising:
   (a) from about 20% to about 90% by weight of the dry fiber basis of the absorbent towel paper web of a refined soft wood pulp fiber mixture comprising:
      i) from about 18.5% to about 88.5% by weight of the dry fiber basis of the absorbent towel paper web of long fiber soft wood pulp fiber;
         wherein the long fiber soft wood pulp fiber is refined at a delivered energy of less than 50.3 kWh/t before being added to the mixture;
      ii) from about 0.25% to about 5.0% by weight of the dry fiber basis of the absorbent towel paper web of cationic strengthening polymer; and,
      iii) from about 0.05% to about 20% by weight of the dry fiber basis of the absorbent towel paper web of cellulose nano-filaments;
   (b) from about 10% to about 55% by weight of the dry fiber basis of the absorbent towel paper web of a hard wood pulp fiber mixture; and,
   (c) not more than about 10% by weight moisture;
      wherein the absorbent towel paper web has a Mean Square Dry Tensile Strength index ranging from about 6 N·m/g to about 12 N·m/g; and,
      wherein the absorbent towel paper web has a Cross-directional Wet Tensile Strength to Cross-directional Dry Tensile Strength Ratio value ranging from about 0.295 to about 0.35.

2. The absorbent towel paper web according to claim 1 wherein the soft wood pulp fiber is refined at a delivered energy of less than about 25 kWh/bdt.

3. The absorbent towel paper web according to claim 1 wherein the soft wood pulp fiber is refined at a delivered energy of less than about 10 kWh/bdt.

4. The absorbent towel paper web according to claim 1 wherein the absorbent towel paper web is produced by a paper making process that introduces differential density within the fibrous web.

5. The absorbent towel paper web according to claim 1 wherein the absorbent towel paper web is produced via a through-air dried paper-making process.

6. The absorbent towel paper web according to claim 1 wherein the absorbent towel paper web is produced via a New Tissue Technology (NTT) paper-making process.

7. The absorbent towel paper web according to claim 1 wherein the absorbent towel paper web is produced via an Advanced Tissue Molding System (ATMOS) paper-making process.

8. The absorbent towel paper web according to claim 1 wherein the absorbent towel paper web is produced via an Uncreped Through Air Dried (UCTAD) paper-making process.

9. An absorbent towel paper web having a differential density, a machine direction, and a cross-machine direction orthogonal to the machine direction, the absorbent towel paper web comprising a fibrous web comprising:
   (a) from about 20% to about 90% by weight of the dry fiber basis of the absorbent towel paper web of a refined soft wood pulp fiber mixture comprising:
      i) from about 18.5% to about 88.5% by weight of the dry fiber basis of the absorbent towel paper web of soft wood pulp fiber;
         wherein the soft wood pulp fiber is refined at a delivered energy of less than 50.3 kWh/t before being added to the mixture;
      ii) from about 0.25% to about 5.0% by weight of the dry fiber basis of the absorbent towel paper web of cationic strengthening polymer; and,
      iii) from about 0.05% to about 20% by weight of the dry fiber basis of the absorbent towel paper web of cellulose nano-filaments;
   (b) from about 10% to about 60% by weight of the dry fiber basis of the absorbent towel paper web of a hard wood pulp fiber mixture; and,
   (c) not more than about 10% by weight moisture;
      wherein the absorbent towel paper web has a Dry Tensile Strength value ranging from about 300 N/m to about 600 N/m; and,
      wherein the absorbent towel paper web has a Cross-directional Wet Tensile Strength to Cross-directional Dry Tensile Strength Ratio value ranging from about 0.295 to about 0.35.

10. The absorbent towel paper web according to claim 9 wherein the soft wood pulp fiber is refined at a delivered energy of less than about 20 kWh/bdt.

11. The absorbent towel paper web according to claim 9 wherein the soft wood pulp fiber is refined at a delivered energy of less than about 10 kWh/bdt.

12. The absorbent towel paper web according to claim 9 wherein the absorbent towel paper web is produced by a paper making process that introduces differential density within the fibrous web.

13. The absorbent towel paper web according to claim 9 wherein the absorbent towel paper web is produced via a through-air dried paper-making process.

14. The absorbent towel paper web according to claim 9 wherein the absorbent towel paper web is produced via a New Tissue Technology (NTT) paper-making process.

15. The absorbent towel paper web according to claim 9 wherein the absorbent towel paper web is produced via an Advanced Tissue Molding System (ATMOS) paper-making process.

16. The absorbent towel paper web according to claim 9 wherein the absorbent towel paper web is produced by an Uncreped Through Air Dried (UCTAD) paper-making process.

17. An absorbent towel paper web having a machine direction and a cross-machine direction orthogonal to the machine direction, the absorbent towel paper web comprising a fibrous web comprising:
  (a) from about 20% to about 90% by weight of the dry fiber basis of the absorbent towel paper web of a refined soft wood pulp fiber mixture comprising:
    i) from about 18.5% to about 88.5% by weight of the dry fiber basis of the absorbent towel paper web of long fiber soft wood pulp fiber;
      wherein the long fiber soft wood pulp fiber is refined at a delivered energy of less than 50.3 kWh/t refined before being added to the mixture;
    ii) from about 0.25% to about 5.0% by weight of the dry fiber basis of the absorbent towel paper web of cationic strengthening polymer; and,
    iii) from about 0.05% to about 20% by weight of the dry fiber basis of the absorbent towel paper web of cellulose nanofilaments;
  (b) from about 10% to about 55% by weight of the dry fiber basis of the absorbent towel paper web of a hard wood pulp fiber mixture; and,
  (c) not more than about 10% by weight moisture;
    wherein the absorbent towel paper web has a Mean Square Dry Tensile Strength index ranging from about 6 N·m/g to about 12 N·m/g; and,
    wherein the absorbent towel paper web has a Cross-directional Wet Tensile Strength to Cross-directional Dry Tensile Strength Ratio value ranging from about 0.20 to about 0.50.

18. The absorbent towel paper web according to claim 17 wherein the soft wood pulp fiber is refined at a delivered energy of less than about 25 kWh/bdt.

19. The absorbent towel paper web according to claim 17 wherein the soft wood pulp fiber is refined at a delivered energy of less than about 10 kWh/bdt.

20. The absorbent towel paper web according to claim 17 wherein the absorbent towel paper web is produced by a paper making process that introduces differential density within the fibrous web.

21. The absorbent towel paper web according to claim 17 wherein the absorbent towel paper web is produced via a through-air dried paper-making process.

22. The absorbent towel paper web according to claim 17 wherein the absorbent towel paper web is produced via a New Tissue Technology (NTT) paper-making process.

23. The absorbent towel paper web according to claim 17 wherein the absorbent towel paper web is produced via an Advanced Tissue Molding System (ATMOS) paper-making process.

24. The absorbent towel paper web according to claim 17 wherein the absorbent towel paper web is produced via an Uncreped Through Air Dried (UCTAD) paper-making process.

* * * * *